US008306523B2

(12) United States Patent
Fischer et al.

(10) Patent No.: US 8,306,523 B2
(45) Date of Patent: Nov. 6, 2012

(54) METHODS AND APPARATUSES SUPPORTING MULTIPLE POSITIONING PROTOCOL VERSIONS IN WIRELESS COMMUNICATION NETWORKS

(75) Inventors: Sven Fischer, Nuremberg (DE); Kirk Allan Burroughs, Alamo, CA (US); Ie-Hong Lin, Cupertino, CA (US); Grant Alexander Marshall, Campbell, CA (US); Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 12/370,552

(22) Filed: Feb. 12, 2009

(65) Prior Publication Data

US 2009/0233620 A1 Sep. 17, 2009

Related U.S. Application Data

(60) Provisional application No. 61/029,288, filed on Feb. 15, 2008, provisional application No. 61/091,692, filed on Aug. 25, 2008, provisional application No. 61/091,699, filed on Aug. 25, 2008.

(51) Int. Cl.
*H04B 1/10* (2006.01)

(52) U.S. Cl. ...................... 455/420; 455/456.1; 455/410; 455/435.1; 455/418; 379/102.01; 707/620; 707/221; 707/237

(58) Field of Classification Search .................. 455/418, 455/435.1, 410, 456.1; 379/102.01; 707/620, 707/221, 237
See application file for complete search history.

(56) References Cited

U.S. PATENT DOCUMENTS

| 7,672,676 B2 | 3/2010 | Gustafsson et al. |
| 2005/0128956 A1 | 6/2005 | Hsu et al. |
| 2006/0282545 A1* | 12/2006 | Arwe et al. ................ 709/237 |

OTHER PUBLICATIONS

TIA-801-A-"Position Determination Service of CDMA2000(R) Spread Spectrum System"—by EIA—Apr. 2004.*
Anonymous: "Position Determination Service for cdma2000(R) Spread Spectrum Systems;(Revision of TIA/EIA/IS-801);TIA-801-A" 19000101, Apr. 2004, XP017004816 p. 2.5-p. 2.6.
International Search Report & Written Opinion—PCT/US2009/034133, International Search Authority—European Patent Office—Jun. 17, 2009.
3GPP2 C.S0022-A, Version 1.0, 3rd Generation Partnership Project 2 "3GPP2", Position Determination Service for cdma 2000 Spread Spectrum Systems, Mar. 2004, www.3gpp2.org.
3GPP2 C.S0022, Version 1.0, 3rd Generation Partnership Project 2 "3GPP2", Location Services (Position Determination Service), www.3gpp2.org.
3GPP2 C.S0022, Version 3.0, 3rd Generation Partnership Project 2 "3GPP2", Position Determination Service Standard for Dual Mode Spread Spectrum Systems, Feb. 16, 2001, www.3gpp2.org.

* cited by examiner

*Primary Examiner* — Jean Gelin
*Assistant Examiner* — Quan Hua
(74) *Attorney, Agent, or Firm* — Jimmy Cheng; Mary A. Fales

(57) ABSTRACT

Methods and apparatuses are provided for supporting multiple positioning protocol versions within wireless communication networks.

60 Claims, 16 Drawing Sheets

2000

| | 8 | 7 | 6 | 5 | 4 | 3 | 2 | 1 |
|---|---|---|---|---|---|---|---|---|
| Octet 1 | SESS_START | SESS_END | SESS_SOURCE | SESS_TAG | | | | |
| Octet 2 | PD_MSG_TYPE ('00000000') | | | | | | | |
| Octet 3 | NUM_REQUESTS | | | | NUM_RESPONSES | | | |
| Octet 4 | (Data) | | | | | | | |
| Octet 5 | (Data) | | | | | | | |

— 2002

| | 8 | 7 | 6 | 5 | 4 | 3 | 2 | 1 |
|---|---|---|---|---|---|---|---|---|
| Octet 1 | SESS_START | SESS_END | SESS_SOURCE | SESS_TAG | | | | |
| Octet 2 | PD_MSG_TYPE ('00000001') | | | | | | | |
| Octet 3 | PD_MSG_LEN (MSB) | | | | | | | |
| Octet 4 | PD_MSG_LEN (LSB) | | REGULATORY_IND | | NUM_REQUESTS | | | |
| Octet 5 | NUM_RESPONSES | | | | (Data) | | | |
| Octet 6 | (Data) | | | | | | | |
| Octet 7 | (Data) | | | | | | | |

— 2004

| | 8 | 7 | 6 | 5 | 4 | 3 | 2 | 1 |
|---|---|---|---|---|---|---|---|---|
| Octet 1 | SESS_START | SESS_END | SESS_SOURCE | SESS_TAG | | | | |
| Octet 2 | PD_MSG_TYPE ('00000010') | | | | | | | |
| Octet 3 | PD_MSG_LEN (MSB) | | | | | | | |
| Octet 4 | PD_MSG_LEN (LSB) | | | | | | | |
| Octet 5 | ASN.1 encoded payload | | | | | | | |
| Octet 6 | | | | | | | | |
| Octet 7 | | | | | | | | |

| | 8 | 7 | 6 | 5 | 4 | 3 | 2 | 1 |
|---|---|---|---|---|---|---|---|---|
| Octet 1 | SESS_START | SESS_END | SESS_SOURCE | SESS_TAG | | | | |
| Octet 2 | PD_MSG_TYPE ('00000000') | | | | | | | |
| Octet 3 | NUM_REQUESTS | | | | NUM_RESPONSES | | | |
| Octet 4<br>Octet N | (Data) | | | | | | | |
| Octet N+1 | SESS_START | SESS_END | SESS_SOURCE | SESS_TAG | | | | |
| Octet N+2 | PD_MSG_TYPE ('00000001') | | | | | | | |
| Octet N+3 | PD_MSG_LEN (MSB) | | | | | | | |
| Octet N+4 | PD_MSG_LEN (LSB) | | REGULATORY_IND | | NUM_REQUESTS | | | |
| Octet N+5 | NUM_RESPONSES | | | | (Data) | | | |
| Octet N+6 | (Data) | | | | | | | |
| Octet N+M | (Data) | | | | | | | |
| Octet N+M+1 | SESS_START | SESS_END | SESS_SOURCE | SESS_TAG | | | | |
| Octet N+M+2 | PD_MSG_TYPE ('00000010') | | | | | | | |
| Octet N+M+3 | PD_MSG_LEN (MSB) | | | | | | | |
| Octet N+M+4 | PD_MSG_LEN (LSB) | | | | | | | |
| Octet N+M+5<br>Octet N+M+6<br>Octet N+M+P | ASN.1 encoded payload | | | | | | | |

Fig. 21

METHODS AND APPARATUSES SUPPORTING MULTIPLE POSITIONING PROTOCOL VERSIONS IN WIRELESS COMMUNICATION NETWORKS

RELATED APPLICATIONS

This patent application claims benefit of and priority to U.S. Provisional Patent Application 61/029,288, filed Feb. 15, 2008, and titled "Positioning Protocol for CDMA, UMB and other Wireless Systems", and which is incorporated in its entirety by reference herein.

This patent application claims benefit of and priority to U.S. Provisional Patent Application 61/091,692, filed Aug. 25, 2008, and titled "MS Information and BS Capabilities for IS-801-B", and which is incorporated in its entirety by reference herein.

This patent application claims benefit of and priority to U.S. Provisional Patent Application 61/091,699, filed Aug. 25, 2008, and titled "Location Response, Reject and Cancellation Request/Response", and which is incorporated in its entirety by reference herein.

BACKGROUND

1. Field

The subject matter disclosed herein relates to wireless communication networks and devices and more particularly to methods and apparatuses for supporting multiple positioning protocol versions within wireless communication networks.

2. Information

Position determination processes may be used to estimate or otherwise determine a location of a device associated with a wireless communication network. In a particular example, a position determination process may be implemented to estimate the location coordinates for a mobile device such as a cellular telephone or other like mobile station. There are a variety of techniques available to support position determination processes. For example, the Global Positioning System (GPS) and/or other like systems may be used to estimate the location of a mobile station. In the context of a wireless communication network, certain position determination processes may require that information and/or processing tasks be shared and/or distributed between and/or among multiple devices. For example, in certain instances a mobile station may be assisted in some manner by one or more other devices as part of a position determination process. As a result, there is often a need for such devices to communicate in some manner, for example, via one or more position determination communication sessions over a wireless link. Thus, one or more positioning protocols may be developed to enable such position determination communication sessions that may be used to support position determination processes.

SUMMARY

In accordance with certain aspects of the present description, robust and efficient version negotiation techniques are presented which may support multiple compatible and/or incompatible protocol versions, and/or which may allow for certain protocol versions to be "skipped over" or otherwise not supported.

In accordance with certain exemplary aspects, methods (and/or specific apparatuses) may be implemented which include, with a first device, determining at least one of a plurality of positioning protocol versions that the first device may be operatively enabled to support in addition to a first positioning protocol version. For example, the plurality of positioning protocol versions may include at least a second positioning protocol version and a third positioning protocol version. The method may include accessing at least one indication signal identifying at least one of the plurality of positioning protocol versions and/or the first positioning protocol version that a second device may be operatively enabled to support, and in response to the indication signal, selectively transmitting at least one capability signal to the second device. Here, for example, if it may be determined that both the first and second devices are operatively enabled to support the third positioning protocol version, then the capability signal initiates a position determination communication session using the third positioning protocol version. If it may be determined that the first device may be not operatively enabled to support the second positioning protocol version but the second device may be operatively enabled to support the second positioning protocol version, then the capability signal initiates the position determination communication session using the first positioning protocol version. Otherwise, if it may be determined that the first and second devices are operatively enabled to support the second positioning protocol version, then the capability signal initiates the position determination communication session using the second positioning protocol version and the capability signal may be transmitted as needed to be in compliance with the second positioning protocol version.

By of example, but not limitation, the indication signal received from the second device may include at least one transport message, which may include a Position Determination Data Message (PDDM) for each positioning protocol version that the second device supports. Here, for example, a first PDDM may be provided which includes a message type field associated with the first positioning protocol version. In certain implementations, a first PDDM may also include a Request "first device" Capabilities request element and/or a Provide "second device" Capabilities response element. If the second device supports the second positioning protocol version, then a second PDDM may be provided which includes a message type field associated with the second positioning protocol version along with a Request Extended "first device" Capabilities request element, and an unsolicited Provide Extended "second device" Capabilities response element. If the second device supports the third positioning protocol version, for example, then a third PDDM may be provided which may include a message type field associated with the third positioning protocol version along with a Request Advanced "first device" Capabilities request element and an unsolicited Provide Advanced "second device" Capabilities response element.

In certain implementations, message length information may be provided within a transport message to identify portion(s) of the transport message associated with the second and/or third PDDMs. In certain implementations, the third PDDM may include a payload that may be encoded, at least in part, using an extensible syntax language.

In accordance with certain other exemplary aspects, methods (and/or specific apparatuses) may be implemented which include, with a first device, determining at least one of a plurality of positioning protocol versions that the first device may be operatively enabled to support in addition to a first positioning protocol version, and transmitting an indication signal to a second device, e.g., a PDDM for each positioning protocol version that the first device supports.

BRIEF DESCRIPTION OF DRAWINGS

FIG. 20 is a diagram illustrating example messages that may be provided in an indication signal(s) to initiate and/or otherwise support a position determination process using one or more positioning protocol versions, in accordance with certain implementations.

FIG. 21 is a diagram illustrating an example transport message that may be provided in a capability signal(s) to initiate and/or otherwise support a position determination process using one or more positioning protocol versions, in accordance with certain implementations.

DETAILED DESCRIPTION

Figure 1:
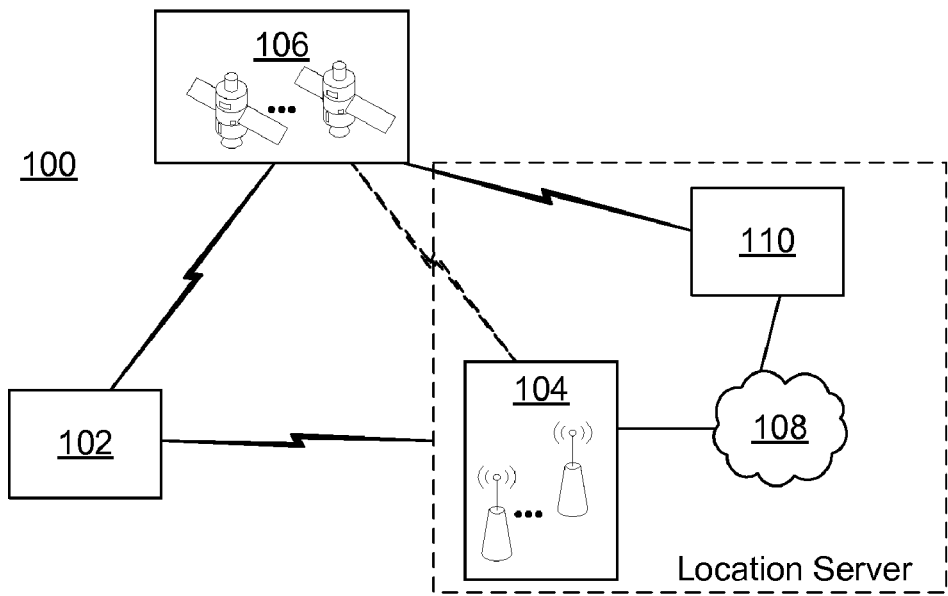
FIG. 1 is a schematic block diagram illustrating an example wireless communication network environment within which at least two devices may be enabled to communicate with one another and initiate and/or otherwise support a position determination process, in accordance with an implementation.

Non-limiting and non-exhaustive aspects are described with reference to the following figures, wherein like reference numerals refer to like parts throughout the various figures unless otherwise specified.

Position determination processes may be used to estimate or otherwise determine a location of a device and in particular examples the location of a mobile device such as a mobile station. There are a variety of techniques available to support position determination processes. In the context of a wireless communication network, certain position determination processes may require that information and/or processing tasks be distributed between and/or among multiple devices. For example, in certain instances a mobile station may be assisted in some manner by one or more other devices as part of a position determination process. As a result, there may be a desire for such devices to communicate in some manner, for example, via one or more position determination communication sessions over a wireless link. One or more positioning protocols may, therefore, be developed to enable such position determination communication sessions that may be used to support position determination processes.

By way of example but not limitation, positioning protocols have been developed and standardized for use in CDMA2000 1X and High Rate Packet Data (HRPD) wireless communication networks. One example positioning protocol is often referred to by its standardization identity as "IS-801" in the Telecommunications Industry Association (TIA) published standards (or "C.S0022" in Third-Generation Partnership Project 2 (3GPP2) published standards). Currently, there are two versions of this example positioning protocol. The first version is the initial version IS-801 version 1 (or C.S0022-0 version 3.0), which will simply be referred to herein as IS-801-1. The second version is IS-801 version A (or C.S0022-A version 1.0), which will simply be referred to herein as IS-801-A.

In the sections that follow, reference will be made to future versions (e.g., similar and/or other protocols, extensions, revisions, etc.) of example positioning protocols and for the sake of brevity and continuity these may be referred to as "IS-801-B", "IS-801-C", and "IS-801-D", even though such versions may or may not at the time of this writing be known or even planned. It is expected, however, that some form of IS-801-B will soon be finalized and will be identified in some manner by TIA and 3GPP2 (e.g., perhaps as IS-801 version B (or C.S0022-B version 1.0), and/or other like identifiers).

Accordingly, certain example implementations of the methods and apparatuses provided herein may be enabled to support one or more standardized positioning protocols, and/or the like. Other example implementations of the methods and apparatuses provided herein may be enabled to provide capabilities and features that, while not necessarily included in a standardized positioning protocol, may nonetheless be beneficial if implemented in certain devices that may be or may not be compliant with such standardized positioning protocols and/or the like. Thus, in certain example implementations, the methods and apparatuses provided herein may be commercially and/or otherwise beneficially implemented in devices to allow such devices to comply in other ways with one or more standardized and/or non-standardized positioning protocols.

With regard to IS-801-1 and IS-801-A, these two example positioning protocol versions are not compatible with one another (e.g., different message sets, etc.) and as such the devices (e.g., a mobile station, base station/PDE) need to decide which version will be used prior to initiating a position determination communication session. Thus, for example, an IS-801-A negotiation sequence requires that an originating device send separate messages, e.g., one associated with IS-801-A and one associated with IS-801-1, to a terminating device in a specific manner. The terminating device sends an applicable response identifying the "highest" level version that both the terminating and originating devices are enabled to support. In addition to providing a message set that is incompatible with the older IS-801-1 version, the version negotiation sequence implemented to support IS-801-A does not appear to be adequately flexible and/or scalable enough to efficiently support newer protocol versions as they are developed.

In accordance with certain aspects of the present description, robust and efficient version negotiation techniques are presented which may support more than two protocol versions and which may allow for certain level versions to be skipped over or otherwise not supported.

Thus, for example, as described in greater detail below in certain implementations a device that supports IS-801-B or later version may negotiate to an earlier or "lower" level version such as IS-801-1, thereby effectively skipping over IS-801-A and/or other possibly intervening level versions. As such, certain devices may be enabled to support all or just selected positioning protocol versions. Additionally, the exemplary techniques presented herein may be implemented in a manner that allows for forward compatibility to future versions.

Newer positioning protocol versions, such as IS-801-B, may be developed to make use of new technology. For example, certain methods and apparatuses provided herein may use IS-801-B messages to request/provide position determination related information/services associated with new SPS (e.g., GNSS) resources such as future GPS resources, a Satellite Based Augmentation System (SBAS) resource, a QZSS resource, a GLONASS resource, a Galileo resource, a Compass/BeiDou resource, and/or other like resources. Here, for example, an SPS resource may be associated with one or more SPS signals, one or more SPS signal bands, one or more space vehicles (SVs), SBAS resources, and/or the like or combination thereof. These messages, e.g., Position Determination Data Messages (PDDMs) and/or transport messages may be implemented to support IS-801-B, as well as legacy and/or future versions. Further still, certain methods and apparatuses may be enabled to support location positioning processes in a variety of wireless communication networks, such as, e.g., an Ultra Mobile Broadband (UMB) network, a High Rate Packet Data (HRPD) network, a CDMA2000 1X network, and/or the like.

In accordance with certain aspects of the present description various methods and apparatuses are provided which may be implemented in a first device that may be enabled to communicate with a second device to initiate a position determination process. By way of example but not limitation, the first and/or second devices may include a mobile station, a base station, a location server (e.g., a Position Determination Entity (PDE), Serving Mobile Location Center (SMLC), Gateway Mobile Location Center (GMLC), Standalone AGPS SMLC (SAS), SUPL Location Platform (SLP), etc.), and/or the like. For example, in certain implementations a mobile station and base station may be operatively enabled to communicate within a CDMA wireless communication network, and/or other applicable type of wireless communication network.

The methods and apparatuses may be implemented in such devices to allow the devices to initiate and/or otherwise establish a position determination communication session associated with a position determination process. A position determination communication session may, for example, utilize a specific positioning protocol depending on the capabilities of the devices involved. Accordingly, the methods and apparatuses may be enabled to allow for positioning protocol version negotiation. By way of example but not limitation, a mobile station and a base station may be enabled to support and/or otherwise perform a Third-Generation Partnership Project 2 (3GPP2) compliant position determination process.

The methods and apparatuses may be implemented to allow for different positioning protocol versions within a network. In certain example implementations, all or portions of a network may be enabled to support a plurality of positioning protocol versions including a first positioning protocol version, and at least a second positioning protocol version and a third positioning protocol version. Here, for example, the second and third positioning protocol versions may include different and possibly subsequently developed/implemented revisions of the first positioning protocol version.

By way of example but not limitation, a first positioning protocol version may be compliant with IS-801-1, a second positioning protocol version may be compliant with IS-801-A, and a third positioning protocol version may be compliant with IS-801-B. Similarly, a fourth, or later positioning protocol version may be compliant with a future version of such standards and/or the like. The methods and apparatuses may, for example, be enabled to allow for or otherwise support backward and/or forward compatibility between various positioning protocol versions within a network.

For example, certain methods and apparatuses may implement a positioning protocol version initiation sequence (e.g., supportive of version discovery and/or negotiation) that is compatible with a plurality of different versions of a positioning protocols, and/or corresponding services and/or messages. With regard to IS-801-A (e.g., which may be considered to be a second positioning protocol version in the examples herein), certain methods and apparatuses may implement a positioning protocol version negotiation process that allows for backward compatibility to a second positioning protocol version initiation sequence as may be applicable to initiate a position determination communication session between two IS-801-A compliant devices. For example, a second positioning protocol version initiation sequence may introduce different messaging requirements which may or may not be compatible in some manner with one or more positioning protocol versions.

In accordance with certain aspects, therefore, example methods and apparatuses may be implemented that allow for devices that may not be compatible with each preceding and/or successive positioning protocol versions. For example, a device may support a first positioning protocol version and a third and/or fourth, and/or later positioning protocol version, while not supporting a second positioning protocol version.

Such capability may be beneficial for example, to manufactures of devices, circuits, and/or software that choose not to support one or more positioning protocol versions. Thus, for example, a manufacturer of chipsets (e.g., a specific apparatus, processing units, implementable instructions, etc.) for certain devices (e.g., mobile stations, base stations, etc.) may choose to reduce costs and/or time during development and/or manufacturing by supporting only a subset of the positioning protocol versions for a given network. Here, for example, a chipset and/or devices may support an initial (e.g., first) positioning protocol version and perhaps the latest and/or certain applicable (e.g., popular, efficient, etc.) positioning protocol version(s), rather than supporting all of the positioning protocol versions. With this in mind, the methods and apparatuses may be implemented in certain implementations to support various positioning protocol versions and/or certain initiation messaging sequences associated therewith.

As described in greater detail in subsequent sections, in certain example implementations, a position determination communication session that uses a third positioning protocol version may allow the first and/or second devices to request and/or provide information associated with various Global Navigation Satellite Service (GNSS). A third positioning protocol version may allow the first and/or second devices to operate with the support of an Ultra Mobile Broadband (UMB) network, a High Rate Packet Data (HRPD) network, a CDMA2000 1X network, GSM, LTE, and/or the like. In certain example implementations, a position determination communication session that uses a third positioning protocol version may allow the first and/or second devices to reject and/or cancel position determination related processes associated with a GNSS, a UMB network, a HRPD network, a CDMA2000 1X network, and/or the like.

With this introduction in mind, methods and apparatuses may be implemented in a first device that enable the first device to determine which of a plurality of positioning protocol versions the first device may be operatively enabled to support in addition to a first positioning protocol version. Here, for example, the plurality of positioning protocol versions include at least a second positioning protocol version, and a third positioning protocol version. The first device may also be enabled to access at least one indication signal identifying which of the plurality of positioning protocol versions in addition to the first positioning protocol version that a second device may be operatively enabled to support. For example, the indication signal may be received by the first device from the second device, and/or may already be known (e.g., stored in memory within the first device).

In response to the indication signal, for example, the first device may be enabled to selectively transmit at least one capability signal to the second device. If both the first and second devices are enabled to support the third positioning protocol version then the capability signal may initiate a position determination communication session using the third positioning protocol version. If it is determined that at least one of the first or second devices is not enabled to support the second positioning protocol version then the capability signal may initiate a position determination communication session using the first positioning protocol version. If it is determined that the first and second devices are enabled to support the second positioning protocol version, then the capability signal may initiate a position determination communication session using the second positioning protocol version and may be, for example, transmitted in compliance with a second positioning protocol version initiation sequence.

In certain example implementations, as described in greater detail below, the indication signal may include at least one transport message including a Position Determination Data Message (PDDM) for each positioning protocol version that the second device may be enabled to support. A PDDM may, for example, include one or more elements or messages, some of which may have been solicited and some of which may have been unsolicited. For example, a "request" element or message may elicit a solicited "provide" element or message, while an unsolicited "provide" element or message may be sent without having been requested.

By way of further general example, a first PDDM sent by a second device to a first device may be provided which includes a message type field or the like that may be associated with a first positioning protocol version. Here, for example, such first PDDM may include a Request "first device" Capabilities request element and/or an unsolicited Provide "second device" Capabilities response element. If the second device supports a second positioning protocol version, for example, then a second PDDM may be sent from the second device to the first device and may include a message type field (or the like) associated with the second positioning protocol version. In certain examples, a second PDDM may include a Request Extended "first device" Capabilities request element, and/or an unsolicited Provide Extended "second device" Capabilities response element. If the second device supports a third positioning protocol version, for example, then a third PDDM may be sent from the second device to the first device and may include a message type field or the like that is associated with the third positioning protocol version. In certain examples, a third PDDM may include a Request Advanced "first device" Capabilities request element and/or an unsolicited Provide Advanced "second device" Capabilities response element.

Thus, for example, if the second device includes a mobile station (MS) and the first device includes a base station (BS) then a Request Advanced "first device" Capabilities request element may include a Request Advanced BS Capabilities request element and an unsolicited Provide Advanced "second device" Capabilities response element may include an unsolicited Provide Advanced MS Capabilities response element.

Conversely, for example, if the second device includes a base station (BS) and the first device includes a mobile station (MS) then a Request Advanced "first device" Capabilities request element may include a Request Advanced MS Capabilities request element and an unsolicited Provide Advanced "second device" Capabilities response element may include an unsolicited Provide Advanced BS Capabilities response element.

In certain example implementations, as described in greater detail in subsequent paragraphs, a transport message may include message length information that identifies a portion(s) of the transport message associated with at least one of the second PDDM and/or the third PDDM. One or more of the PDDMs and/or response elements may, for example, include a revision level indicator associated with one of either the first, second, or third positioning protocol versions.

In accordance with certain other aspects, various methods and apparatuses may be implemented in a first device to provide (e.g., originate) an indication signal to second device. Here, for example, a first device may be enabled to determine at least one of a plurality of positioning protocol versions the first device may be operatively enabled to support in addition to a first positioning protocol version. Again, for example, the plurality of positioning protocol versions may include at least a second positioning protocol version and a third positioning protocol version.

The first device may also be enabled to transmit an indication signal to a second device. An indication signal may include a PDDM for each positioning protocol version that the first device supports. Thus, for example, a first PDDM may be provided which includes a message type field or the like that may be associated with the first positioning protocol version. If the first device supports the second positioning protocol version then a second PDDM may be provided which includes a message type field or the like that may be associated with the second positioning protocol version. The second PDDM may, for example, include a Request Extended "second device" Capabilities request element and/or an unsolicited Provide Extended "first device" Capabilities response element. If the first device supports the third positioning protocol version then a third PDDM may be provided which includes a message type field or the like that is associated with the third positioning protocol version. The third PDDM may, for example, include a Request Advanced "second device" Capabilities request element and/or an unsolicited Provide Advanced "first device" Capabilities response element.

In certain implementations, an indication signal may include at least one transport message that is transmitted within a Data Burst Message, an IP Packet, or the like. Thus, in certain implementations, a plurality of PDDMs may be concatenated or otherwise arranged within a transport message. As such, for example, message length information may be included within the transport message that identifies or otherwise specifies portions of the transport message associated with each PDDM within the transport message.

Attention is now drawn to FIG. 1, which is a schematic block diagram illustrating an example wireless communication network environment 100 within which devices may be enabled to communicate with one another and initiate and/or otherwise support a position determination process.

In this particular example, wireless communication network environment 100 includes representative devices such as a mobile station (MS) 102, one or more base stations (BS) 104, one or more Satellite Positioning System(s) (SPS) 106, a network 108, and a location server 110. MS 102 may be enabled to communicate with BS 104 over one or more wireless communication links. One or more of MS 102, BS 104, or location server 110 may be enabled to acquire SPS signals transmitted by various transmitting resources of SPS 106, and/or otherwise be enabled to support certain position determination processes associated with information available via SPS 106.

Although the representative devices in FIG. 1 are illustrated as being coupled by either wireless communication links or wired communication links it should be understood that in certain example implementations at least some the devices may be coupled together via one or more wired, fiber, and/or wireless communication link(s).

Unless specifically stated otherwise, as used herein, the term "location server" is intended to represent one or more devices and/or one or more specific apparatuses therein that is/are enabled to support, at least in part, such position determination processes. Thus, while illustrated as a separate device in the example shown in FIG. 1 that may communicate via network 108 and/or a BS 104 with MS 102, it should be understood that in other implementations a "location server" may be enabled to communicate directly and/or indirectly with MS 102 using one or more wired and/or one or more wireless communication links. Hence, in certain example implementations, a location server may take the form of and/or otherwise operatively comprise one or more wireless transmitters, receivers, transceivers, one or more base stations, various wired and/or wireless network resources, one or more computing devices enabled as specific apparatuses, and/or other like computing and/or communication devices. With this in mind, where example references are made to a base station (BS) or a BS 104, it should be understood that such BS and/or BS 104 may comprise a "location server" as broadly defined herein. Accordingly, the terms base station (BS) and location server are used interchangeably. Further still, in messages requesting and/or providing BS capabilities, etc., it should be understood that such requested information and/or provided information may be associated with location server capabilities, etc.

MS 102 and/or BS 104 may be enabled to provide functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA)

network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. As mentioned earlier, the techniques may be implemented for use with a UMB network, a HRPD network, a CDMA2000 1X network, GSM, LTE, and/or the like.

SPS 106 may, for example, include one or more of the GPS, Galileo, GLONASS, NAVSTAR, SBAS, QZSS, Compass/BeiDou, and/or other like GNSS, a system that uses satellites from a combination of these systems, or any SPS developed in the future, each referred to generally herein as a "Satellite Positioning System" (SPS).

Furthermore, the methods and apparatuses described herein may be used with position determination processes that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be used to augment an SPS, for example, in situations where some SPS signals from orbiting satellites might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

MS 102, in certain example implementations, may include a device such as a cellular or other wireless communication device, personal communication system (PCS) device, personal navigation device, a vehicle mountable navigation device, a tracking device, Personal Information Manager (PIM), Personal Digital Assistant (PDA), laptop or other suitable device which may be capable of receiving wireless communications.

The methodologies described herein may be implemented by various means depending upon the application. For example, these methodologies may be implemented in hardware, firmware, software, or a combination thereof. For a hardware implementation, one or more processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of MS 102 and/or BS 104 and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Figure 2:
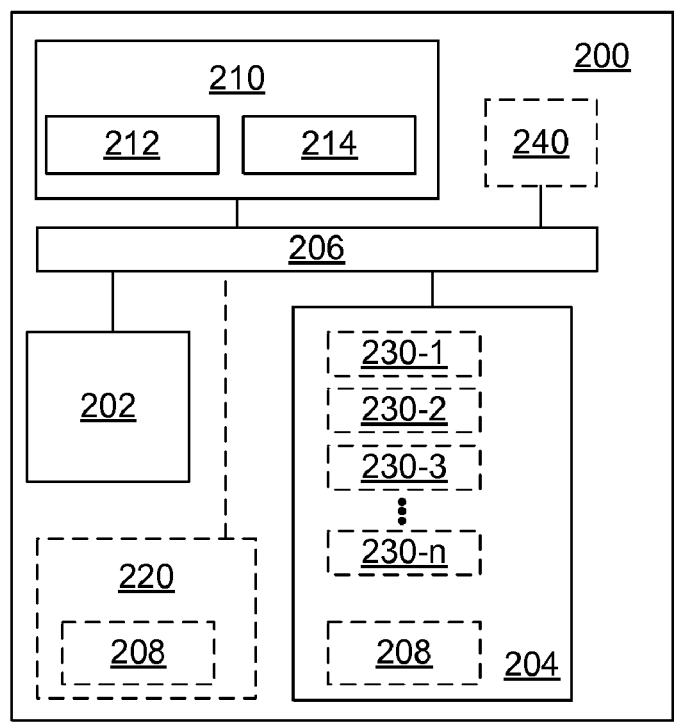
FIG. 2 is a schematic block diagram illustrating certain example features of a device that may be enabled to initiate and/or otherwise support a position determination process in accordance with an implementation.

Reference is now made to FIG. 2, which is a schematic block diagram illustrating certain example features of an apparatus 200 enabled to initiate and/or otherwise support a position determination process. Apparatus 200 may, for example, be implemented in some form within MS 102, BS 104, location server 110, and/or other like devices, as applicable, to perform or otherwise support at least a portion of the example techniques described herein.

Apparatus 200 may, for example, include one or more processing units 202, memory 204, a transceiver 210, and (optionally) an SPS receiver 240), which may be operatively coupled with one or more connections 206 (e.g., buses, lines, fibers, links, etc.). In certain example implementations, apparatus 200 may take the form of a chipset, and/or the like.

Processing unit 202 may be implemented in hardware, software, or a combination of hardware and software. Thus, for example, processing unit 202 may represent one or more circuits configurable to perform at least a portion of a data computing procedure or process related to the operation of device 200. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 204 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 220. As such, in certain example implementations, the methods and/or apparatuses presented herein may take the form in whole or part of a computer readable medium 220 that may include computer implementable instructions 208 stored thereon, which if executed by at least one processing unit 202 may be operatively enabled to perform all or portions of the example operations as described herein.

As illustrated in FIG. 2, memory 204 may also include instructions and/or data associated with one or more positioning protocol versions 230-1, 230-2, 230-3, . . . , 230-n. For example, positioning protocol version 230-1 may include instructions and/or data associated with a first positioning protocol version, positioning protocol version 230-2 may include instructions and/or data associated with a second positioning protocol version, positioning protocol version 230-3 may include instructions and/or data associated with a third positioning protocol version, and positioning protocol version 230-n may include instructions and/or data associated with an "$n^{th}$" second positioning protocol version.

Transceiver 210 may, for example, include a transmitter 212 enabled to transmit one or more signals over one or more wireless communication links and a receiver 214 to receive one or more signals transmitted over one or more wireless communication links. In certain implementations, transceiver 210 may also support wired transmission and/or reception, e.g., when implemented within BS 104 and/or other like devices.

Figure 3A:
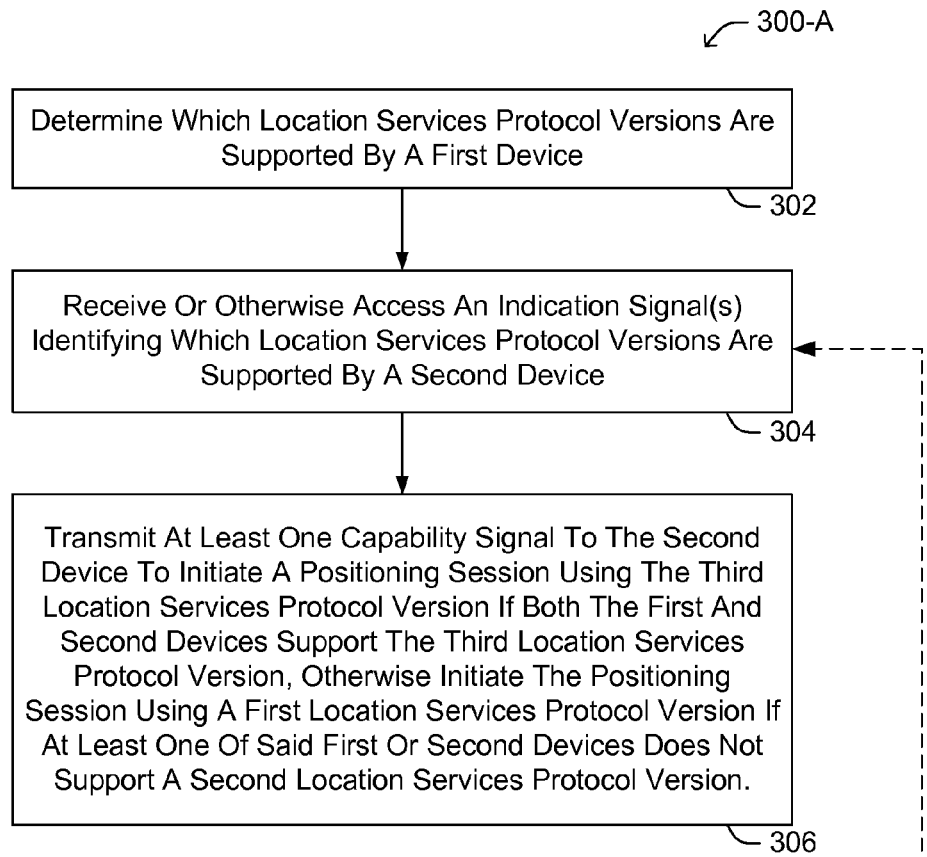
FIG. 3A is a flow-diagram illustrating an exemplary method that may be implemented in one or more devices to initiate and/or otherwise support a position determination process in accordance with an implementation.
Figure 3B:
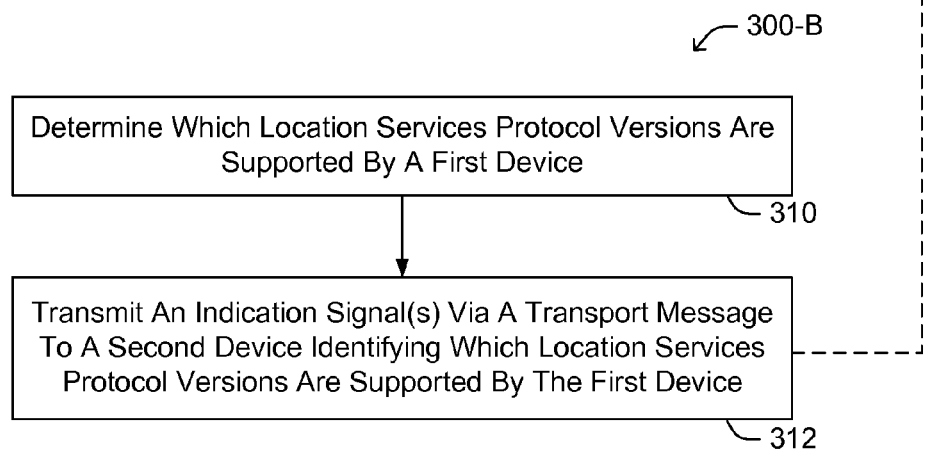
FIG. 3B is a flow-diagram illustrating an exemplary method that may be implemented in one or more devices to initiate and/or otherwise support a position determination process in accordance with an implementation.

Attention is drawn next to FIGS. 3A and 3B, which are flow-diagrams illustrating some exemplary methods that may be implemented in apparatus 200 and/or the like within a device to initiate and/or otherwise support a position determination process.

In method 300-A, at block 302, it may be determined which positioning protocol versions are supported by a first device. Here, for example, a first device may take the form of MS 102, BS 104, and/or location server 110 (see FIG. 1). By way of example but not limitation, method 300-A may determine which positioning protocol versions are supported by a first device based on one or more positioning protocol versions 230-1, 230-2, 230-3, . . . , 230-n (see FIG. 2). At block 304, one or more indication signals may be received and/or otherwise accessed to determine and/or otherwise identify which positioning protocol versions are supported by a second device. Here, for example, a second device may take the form of MS 102, BS 104, and/or location server 110 (see FIG. 1) as applicable to communicate with the first device. By way of example but not limitation, method 300-B may determine which positioning protocol versions are supported by a second device based on information within one or more PDDMs, and/or transport messages.

At block 306, at least one capability signal may be transmitted by the first device to the second device to initiate a position determination communication session. In response to the indication signal, for example, the first device may be enabled to selectively transmit at least one capability signal to the second device. Here, for example, if both the first and second devices are determined to be enabled to support a third positioning protocol version, then a capability signal may initiate a position determination communication session using the third positioning protocol version. If it is determined that at least one of the first or second devices is not enabled to support a second positioning protocol version then a capability signal may initiate a position determination communication session using a first positioning protocol version (e.g., a default or initial version). If it is determined that the first and second devices are enabled to support a second positioning protocol version, then a capability signal may initiate a position determination communication session using the second positioning protocol version and may be, for example, transmitted in compliance with a second positioning protocol version initiation sequence.

In method 300-B, at block 310 it may be determined which positioning protocol versions are supported by a first device (e.g., actually the "second" device in the example above in method 300-A). Here, for example, a first device may take the form of MS 102, BS 104, and/or location server 110 (see FIG. 1). By way of example but not limitation, method 300-b may determine which positioning protocol versions are supported by a first device based on one or more positioning protocol versions 230-1, 230-2, 230-3, . . . , 230-n (see FIG. 2).

At block 312, an indication signal(s) may be transmitted to a second device (e.g., actually the "first" device in the example above in method 300-A) via a transport message. By way of example, the indication signal(s) may include information within one or more PDDMs, and/or transport messages that specify which positioning protocol version(s) are supported by the first device.

The above exemplary methods and apparatuses may, for example, be enabled to support positioning protocol version negotiation as illustrated in the various examples as described below.

FIGS. 4-19 are flow diagrams illustrating various exemplary message exchanges between two devices enabled to initiate and/or otherwise support a position determination process using one or more positioning protocol versions. Here, by way of example but not limitation the devices are illustrated as mobile stations and base stations, which support at least one of at least three example positioning protocol versions. Here, for example, three positioning protocol versions may include a first positioning protocol version (e.g., IS-801-1), a second positioning protocol version (e.g., IS-801-A), and/or a third positioning protocol version (e.g., IS-801-B).

In these example flow diagrams, one of the devices is deemed as "originating" a position determination process and the other as "terminating" a position determination process. Also, in these example flow diagrams, various example messages are illustrated, which may include one or more indication signals from an originating device to a terminating device, and one or more capability signals from a terminating device to an originating device. The one or more indication signals and/or one or more capability signals may, for example, include one or more PDDMs within one or more transport messages. A PDDM may include a PD_

MSG_TYPE, and possibly one or more request elements and/or response elements. If two or more PDDMs are transmitted via a transport message, then in the example flow-diagrams they are listed above a single arrow.

Figure 4:
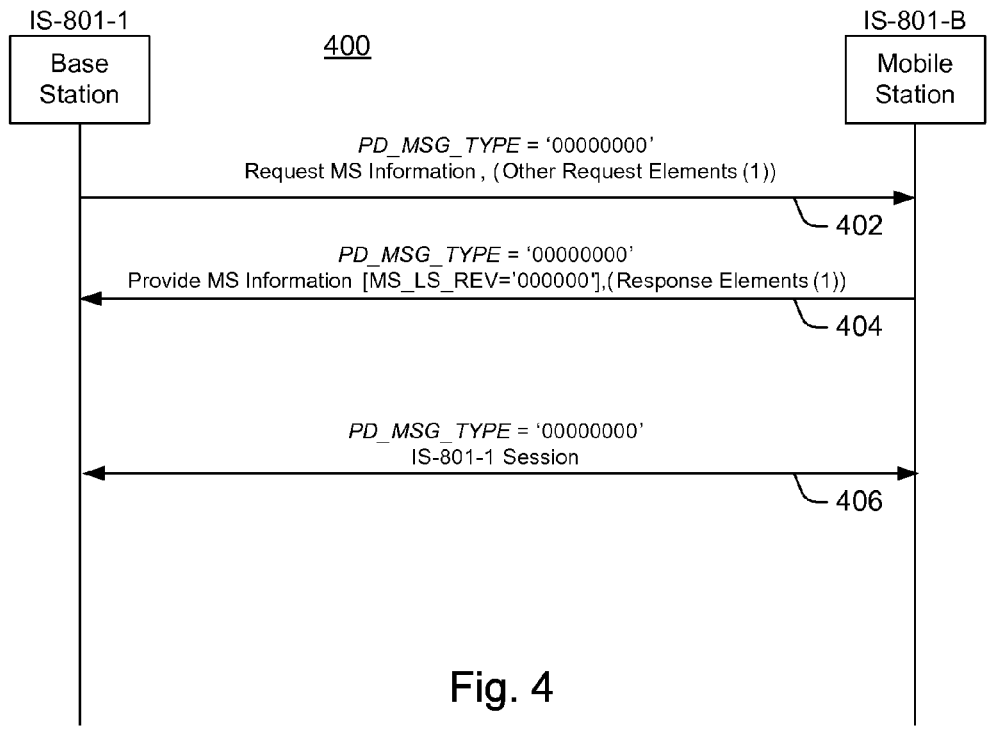
FIG. 4 is a flow diagram illustrating an exemplary message exchange between two devices enabled to initiate and/or otherwise support a position determination process using one or more positioning protocol versions, in accordance with certain implementations.

FIG. 4 shows an example version negotiation process 400, wherein an originating BS supports IS-801-1 and a terminating MS supports IS-801-1 and IS-801-B. As shown at 402, the BS may transmit a PD_MSG_TYPE="00000000" to the MS, which may serve as an indication signal specifying that the sender supports IS-801-1. In response at 404, the MS may transmit a PD_MSG_TYPE="00000000" to the BS, which may serve as capability signal specifying that the sender supports IS-801-1 and which may initiate a position determination communication session, at 406, using such positioning protocol version.

Figure 5:
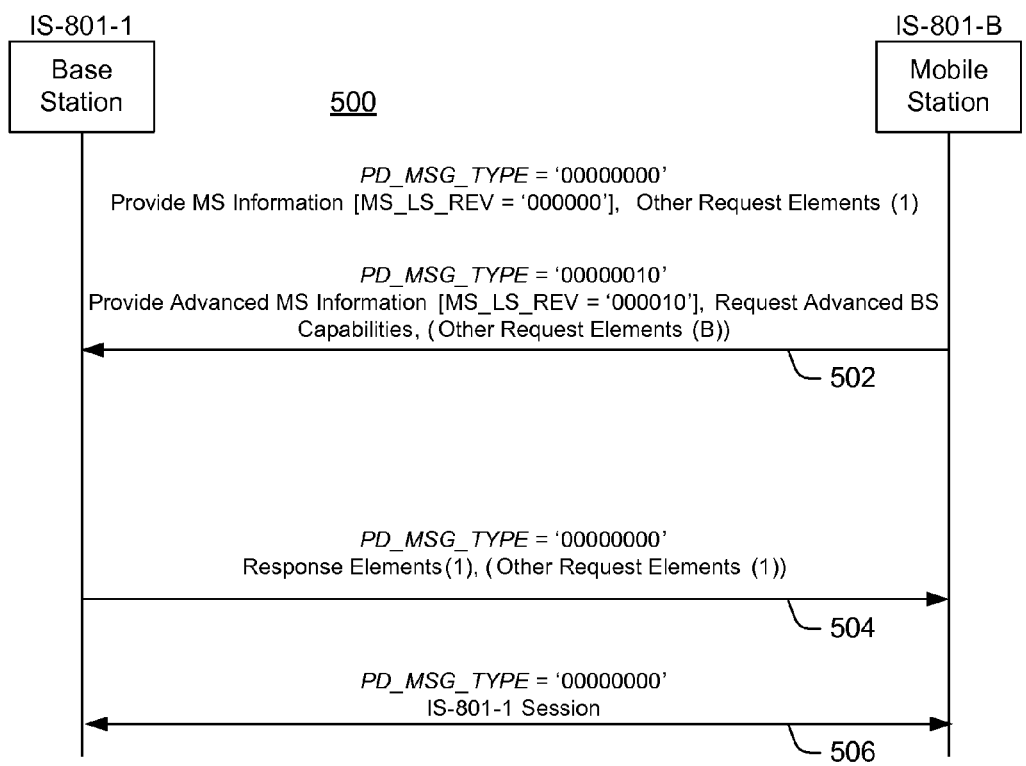
FIG. 5 is a flow diagram illustrating an exemplary message exchange between two devices enabled to initiate and/or otherwise support a position determination process using one or more positioning protocol versions, in accordance with certain implementations.

FIG. 5 shows an example version negotiation process 500, wherein an originating MS supports IS-801-1 and IS-801-B, and a terminating BS supports IS-801-1. As shown at 502, the MS may transmit PD_MSG_TYPE="00000000" and PD_MSG_TYPE="00000010" to the BS, which may serve as indication signal(s) specifying that the sender supports IS-801-1 and IS-801-B, respectively. In response at 504, the BS may transmit a PD_MSG_TYPE="00000000" to the MS, which may serve as capability signal specifying that the sender supports IS-801-1 and which may initiate a position determination communication session, at 506, using such positioning protocol version.

Figure 6:
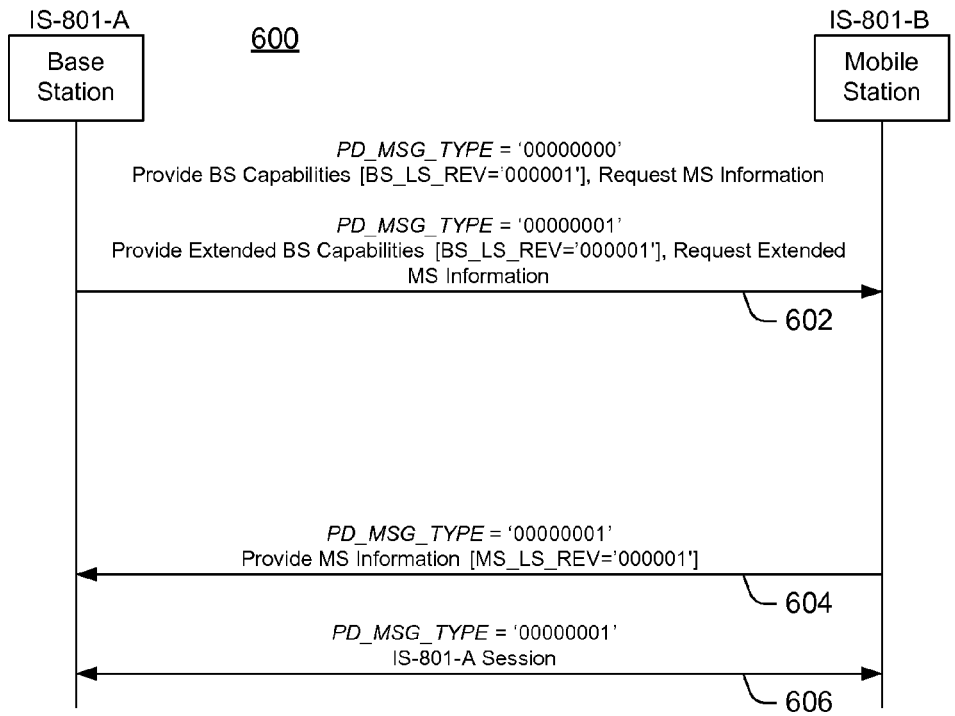
FIG. 6 is a flow diagram illustrating an exemplary message exchange between two devices enabled to initiate and/or otherwise support a position determination process using one or more positioning protocol versions, in accordance with certain implementations.

FIG. 6 shows an example version negotiation process 600, wherein an originating BS supports IS-801-1 and IS-801-A, and a terminating MS supports IS-801-1, IS-801-A and IS-801-B. As shown at 602, the BS may transmit PD_MSG_TYPE="00000000" and PD_MSG_TYPE="00000001" to the MS, which may serve as indication signal(s) specifying that the sender supports IS-801-1 and IS-801-A, respectively. In response at 604, the MS may transmit a PD_MSG_TYPE="00000001" to the BS, which may serve as capability signal specifying that the sender supports IS-801-A and which may initiate a position determination communication session, at 606, using such positioning protocol version. Here, for example, the capability signal(s) may be transmitted in compliance with a specific initiation sequence associated with IS-801-A.

Figure 7:
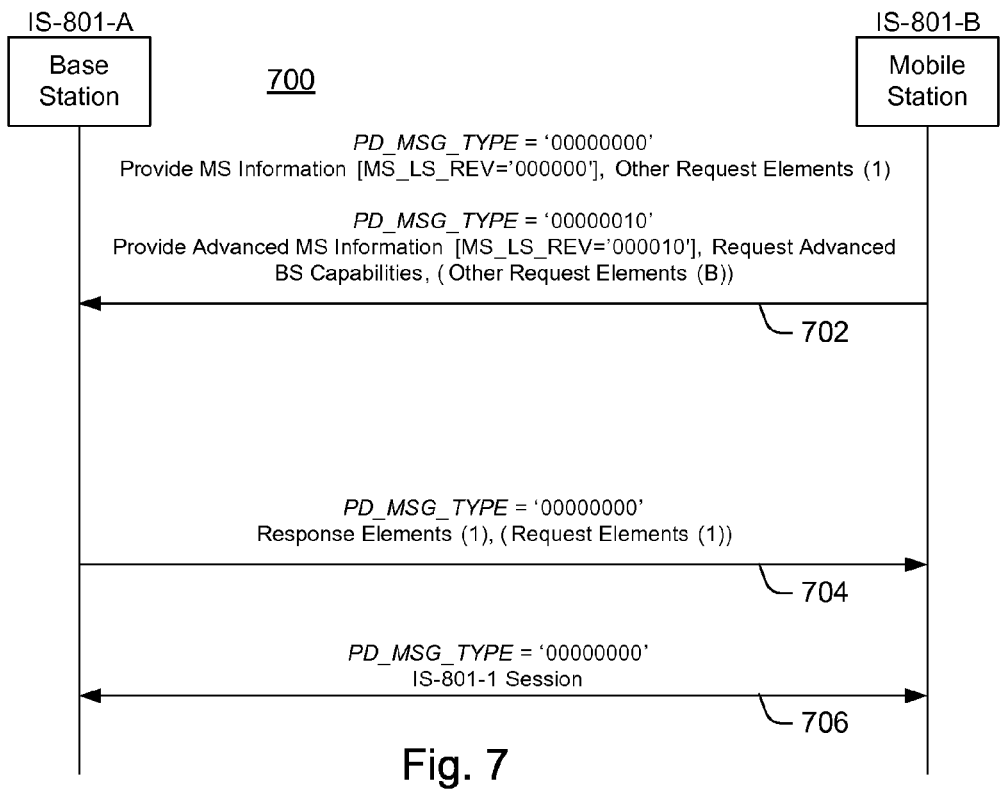
FIG. 7 is a flow diagram illustrating an exemplary message exchange between two devices enabled to initiate and/or otherwise support a position determination process using one or more positioning protocol versions, in accordance with certain implementations.

FIG. 7 shows an example version negotiation process 700, wherein an originating MS supports IS-801-1 and (at least) IS-801-B, and a terminating BS supports IS-801-1 and IS-801-A. As shown at 702, the MS may transmit PD_MSG_TYPE="00000000" and at least PD_MSG_TYPE="00000010" to the BS, which may serve as indication signal(s) specifying that the sender supports IS-801-1 and at least IS-801-B, respectively. In response at 704, the BS may transmit a PD_MSG_TYPE="00000000" to the MS, which may serve as capability signal specifying that the sender supports IS-801-1 and which may initiate a position determination communication session, at 706, using such positioning protocol version.

Figure 8:
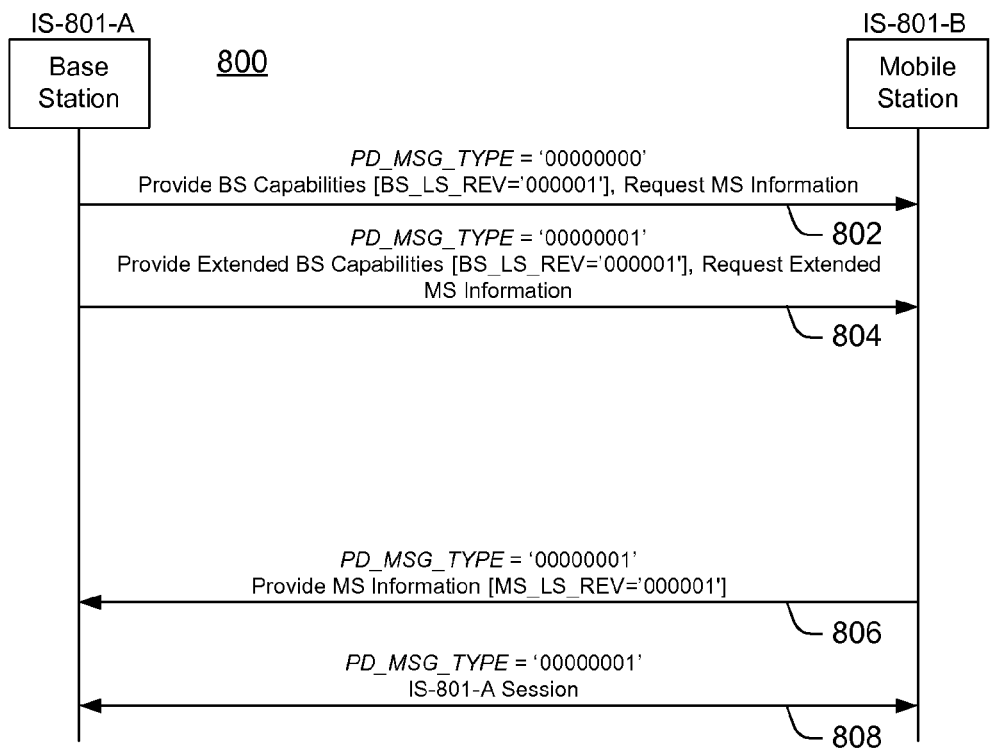
FIG. 8 is a flow diagram illustrating an exemplary message exchange between two devices enabled to initiate and/or otherwise support a position determination process using one or more positioning protocol versions, in accordance with certain implementations.

FIG. 8 shows an example version negotiation process 800, wherein an originating BS supports IS-801-1 and IS-801-A, and a terminating MS supports IS-801-1, IS-801-A and IS-801-B. As shown at 802, the BS may transmit PD_MSG_TYPE="00000000" to the MS and, at 804, the BS may transmit PD_MSG_TYPE="00000001" to the MS, which may serve as indication signal(s) specifying that the sender supports IS-801-1 and IS-801-A, respectively. Here, for example, indication signal(s) may be transmitted in compliance with a specific initiation sequence associated with IS-801-A. Also, here, in PD_MSG_TYPE="00000000" a revision BS_LS_REV="00000001", which may allow the MS to ignore the PD_MSG_TYPE="00000000" PDDM at 802 and instead await the PD_MSG_TYPE="00000001" PDDM at 804. Thus, in response at 806, the MS may transmit a PD_MSG_TYPE="00000001" to the BS, which may serve as capability signal specifying that the sender supports IS-801-A and which may initiate a position determination communication session, at 808, using such positioning protocol version. Here also, for example, the capability signal(s) may be transmitted in compliance with a specific initiation sequence associated with IS-801-A.

Figure 9:
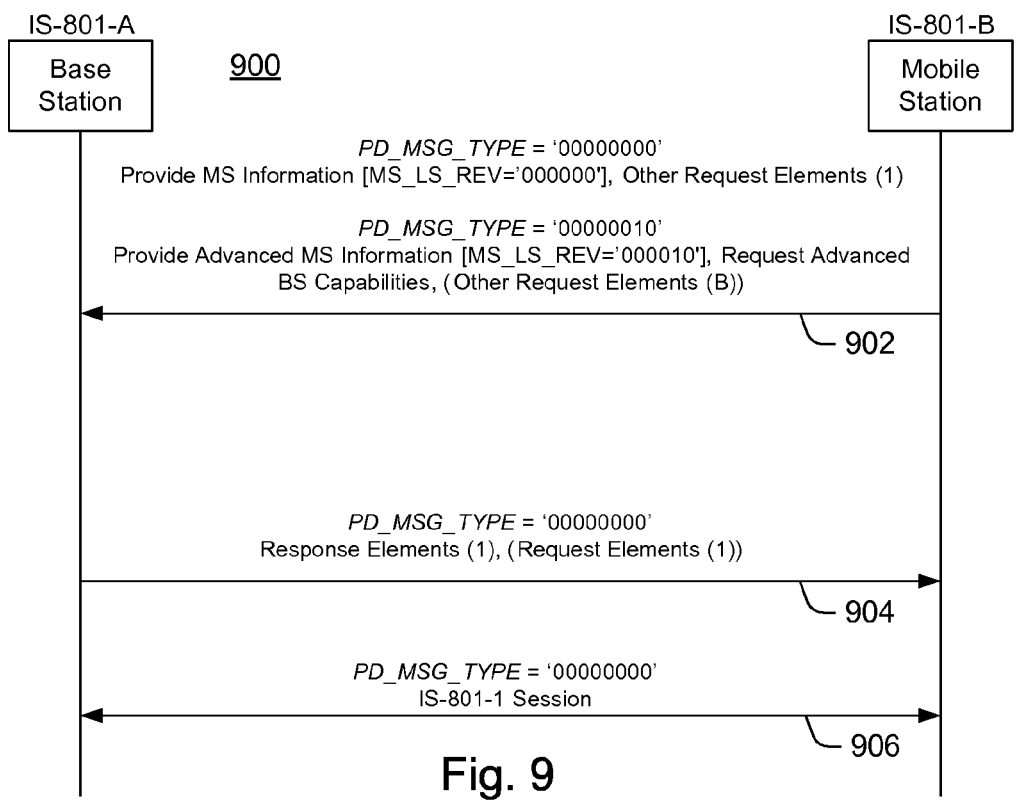
FIG. 9 is a flow diagram illustrating an exemplary message exchange between two devices enabled to initiate and/or otherwise support a position determination process using one or more positioning protocol versions, in accordance with certain implementations.

FIG. 9 shows an example version negotiation process 900, wherein an originating MS supports IS-801-1 and (at least) IS-801-B, and a terminating BS supports IS-801-1 and IS-801-A. As shown at 902, the MS may transmit PD_MSG_TYPE="00000000" and PD_MSG_TYPE="00000010" to the BS, which may serve as indication signal(s) specifying that the sender supports IS-801-1 and at least IS-801-B, respectively. In response at 904, the BS may transmit a PD_MSG_TYPE="00000000" to the MS, which may serve as capability signal specifying that the sender supports IS-801-1 and which may initiate a position determination communication session, at 906, using such positioning protocol version.

Figure 10:
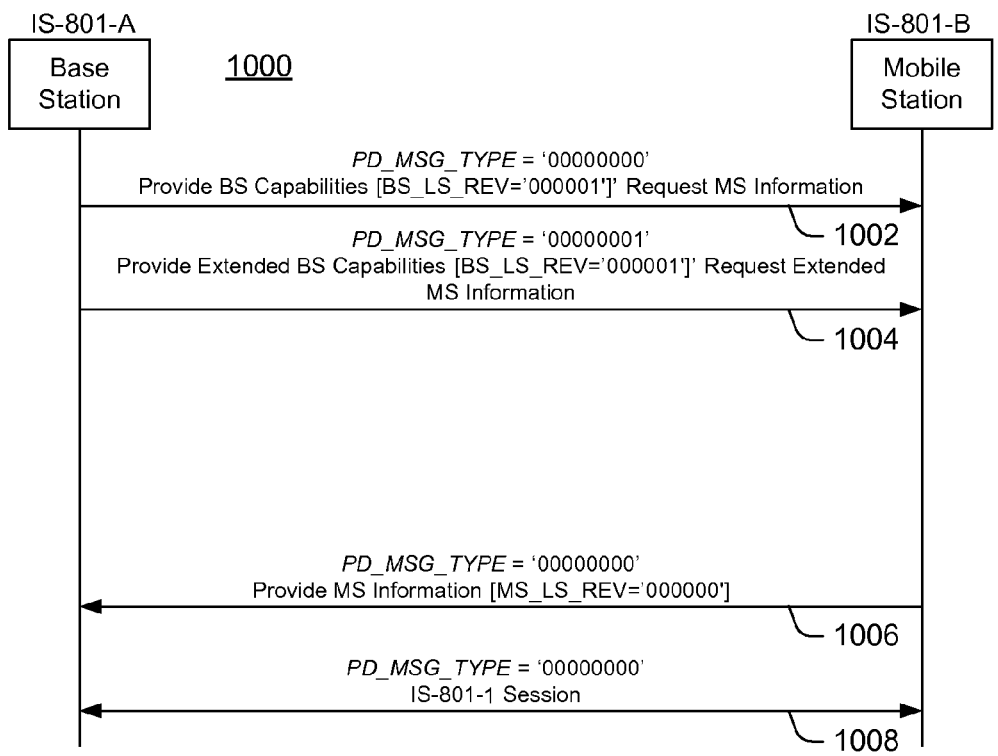
FIG. 10 is a flow diagram illustrating an exemplary message exchange between two devices enabled to initiate and/or otherwise support a position determination process using one or more positioning protocol versions, in accordance with certain implementations.

FIG. 10 shows an example version negotiation process 1000, wherein an originating BS supports IS-801-1 and IS-801-A, and a terminating MS supports IS-801-1 and IS-801-B. As shown at 1002, the BS may transmit PD_MSG_TYPE="00000000" to the MS, and, at 1004, the BS may transmit PD_MSG_TYPE="00000001" to the MS, which may serve as indication signal(s) specifying that the sender supports IS-801-1 and IS-801-A, respectively. Here, for example, the indication signal(s) may be transmitted in compliance with a specific initiation sequence associated with IS-801-A. Also, here, in PD_MSG_TYPE="00000000" a revision BS_LS_REV="00000001", which may allow the MS to ignore the subsequent PD_MSG_TYPE="00000001" PDDM at 1004. Thus, in response at 1006, the MS may transmit a PD_MSG_TYPE="00000000" to the BS, which may serve as capability signal specifying that the sender supports IS-801-1 and which may initiate a position determination communication session, at 1008, using such positioning protocol version. Here also, for example, the capability signal(s) may be transmitted in compliance with a specific initiation sequence associated with IS-801-1.

Figure 11:
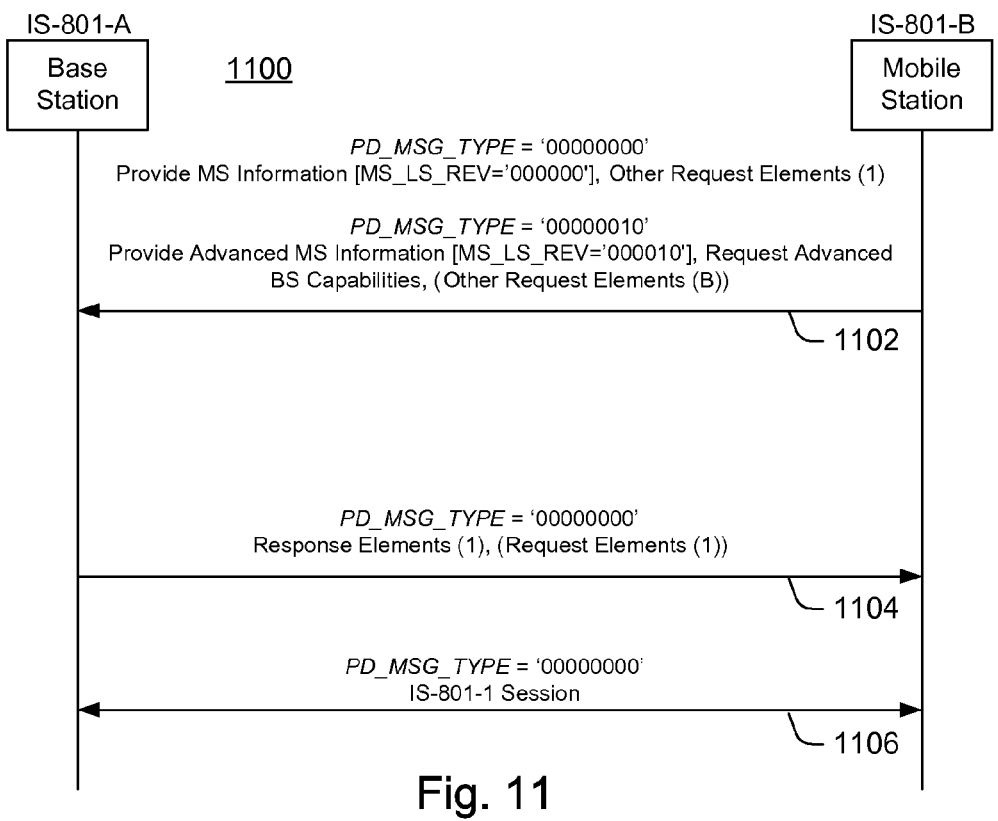
FIG. 11 is a flow diagram illustrating an exemplary message exchange between two devices enabled to initiate and/or otherwise support a position determination process using one or more positioning protocol versions, in accordance with certain implementations.

FIG. 11 shows an example version negotiation process 1100, wherein an originating MS supports IS-801-1 and IS-801-B, and a terminating BS supports IS-801-1 and IS-801-A. As shown at 1102, the MS may transmit PD_MSG_TYPE="00000000" and PD_MSG_TYPE="00000010" to the BS, which may serve as indication signal(s) specifying that the sender supports IS-801-1 and IS-801-B, respectively. In response at 1104, the BS may transmit a PD_MSG_TYPE="00000000" to the MS, which may serve as capability signal specifying that the sender supports IS-801-1 and which may initiate a position determination communication session, at 1106, using such positioning protocol version.

Figure 12:
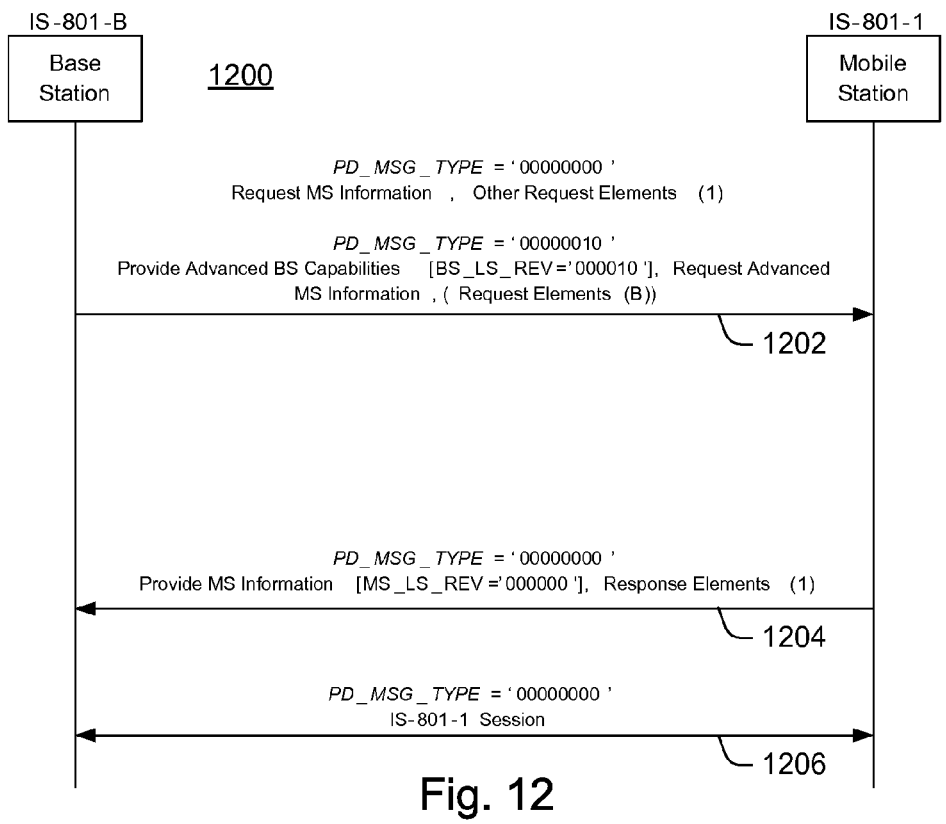
FIG. 12 is a flow diagram illustrating an exemplary message exchange between two devices enabled to initiate and/or otherwise support a position determination process using one or more positioning protocol versions, in accordance with certain implementations.

FIG. 12 shows an example version negotiation process 1200, wherein an originating BS supports IS-801-1 and IS-801-B, and a terminating MS only supports IS-801-1. As shown at 1202, the BS may transmit PD_MSG_TYPE="00000000" and PD_MSG_TYPE="00000010" to the MS, which may serve as indication signal(s) specifying that the sender supports IS-801-1 and IS-801-B, respectively. In response at 1204, the MS may transmit a PD_MSG_TYPE="00000000" to the BS, which may serve as capability signal specifying that the sender supports IS-801-1 and which may initiate a position determination communication session, at 1206, using such positioning protocol version.

Figure 13:
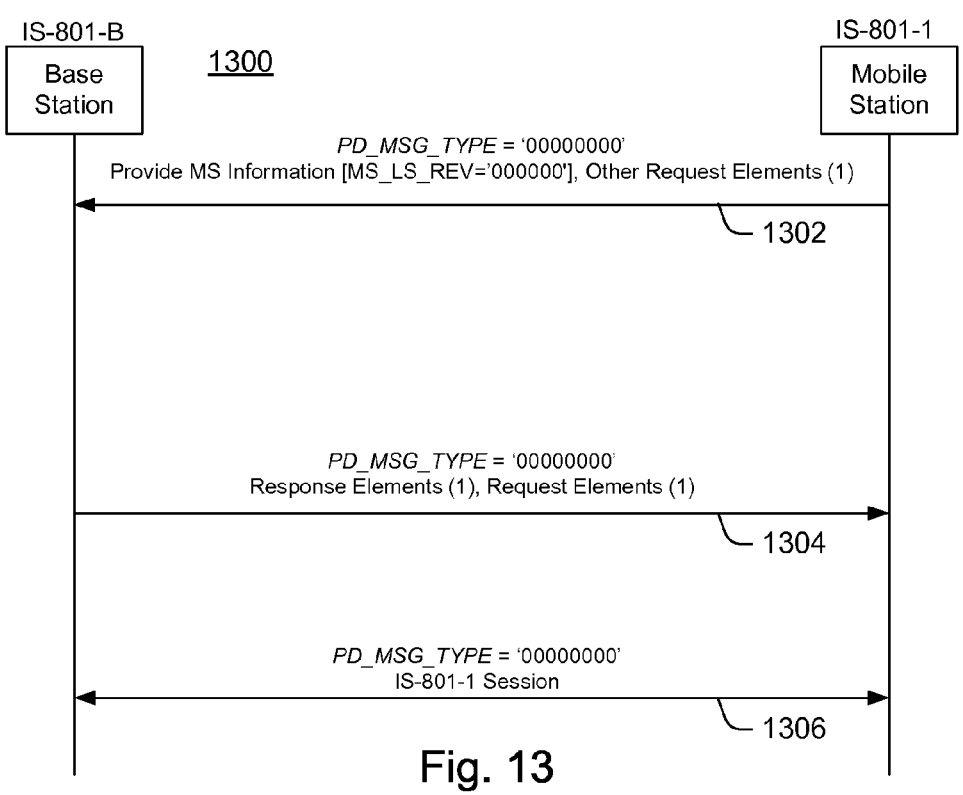
FIG. 13 is a flow diagram illustrating an exemplary message exchange between two devices enabled to initiate and/or otherwise support a position determination process using one or more positioning protocol versions, in accordance with certain implementations.

FIG. 13 shows an example version negotiation process 1300, wherein an originating MS only supports IS-801-1, and a terminating BS supports IS-801-1 and IS-801-B. As shown at 1302, the MS may transmit PD_MSG_TYPE="00000000" to the BS, which may serve as indication signal(s) specifying that the sender supports IS-801-1. In response at 1304, the BS may transmit a PD_MSG_TYPE="00000000" to the MS, which may serve as capability signal specifying that the sender supports IS-801-1 and which may initiate a position determination communication session, at 1306, using such positioning protocol version.

Figure 14:
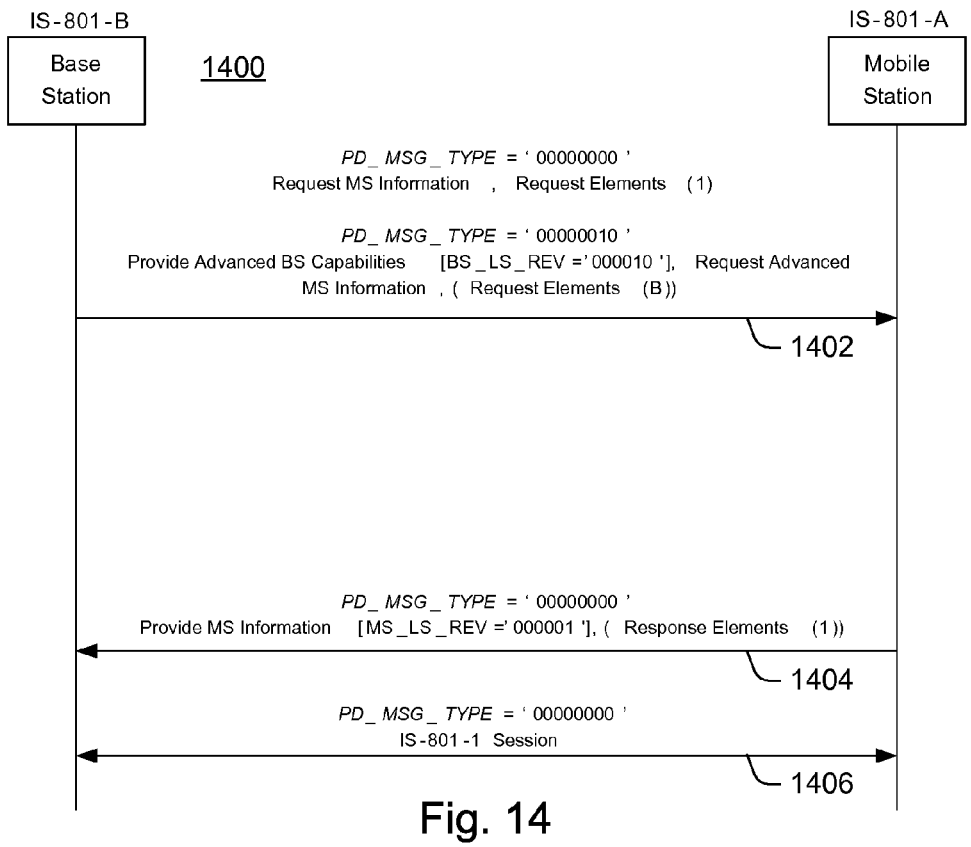
FIG. 14 is a flow diagram illustrating an exemplary message exchange between two devices enabled to initiate and/or otherwise support a position determination process using one or more positioning protocol versions, in accordance with certain implementations.

FIG. 14 shows an example version negotiation process 1400, wherein an originating BS supports IS-801-1 and IS-801-B, and a terminating MS supports IS-801-1 and IS-801-A. As shown at 1402, the BS may transmit PD_MSG_TYPE="00000000" and PD_MSG_TYPE="00000010" to the MS, which may serve as indication signal(s) specifying that the sender supports IS-801-1 and IS-801-B, respectively. In response at 1404, the MS may transmit a PD_MSG_TYPE="00000000" to the BS, which may serve as capability signal specifying that the sender supports IS-801-1 and which may initiate a position determination communication session, at 1406, using such positioning protocol version.

Figure 15:
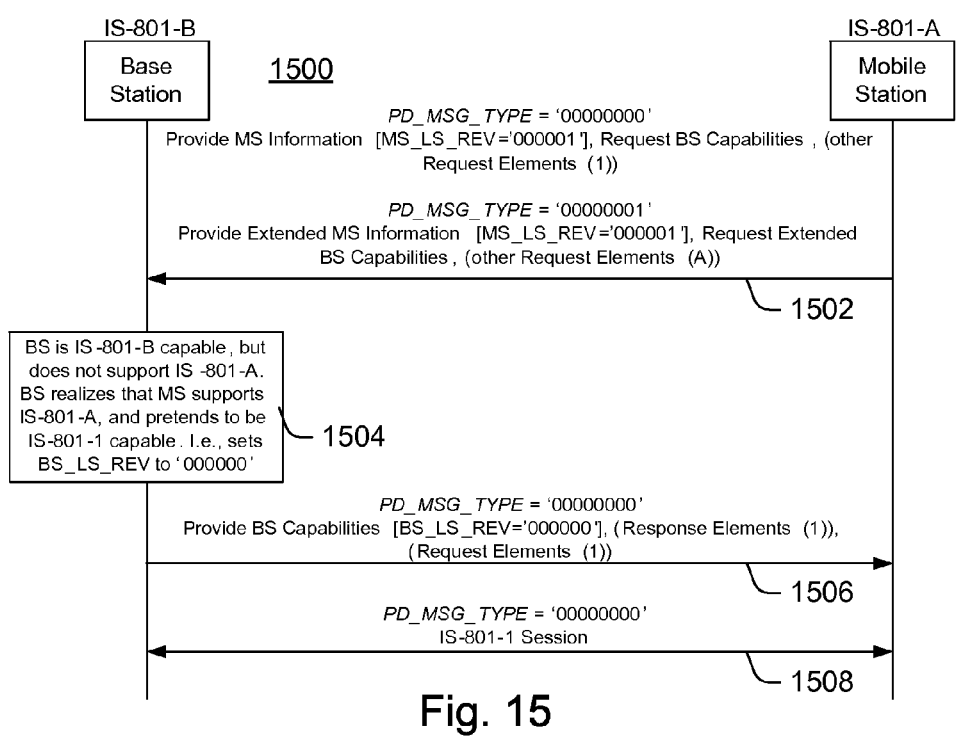
FIG. 15 is a flow diagram illustrating an exemplary message exchange between two devices enabled to initiate and/or otherwise support a position determination process using one or more positioning protocol versions, in accordance with certain implementations.

FIG. 15 shows an example version negotiation process 1500, wherein an originating MS supports IS-801-1 and IS-801-A, and a terminating BS supports IS-801-1 and IS-801-B. As shown at 1502, the MS may transmit PD_MSG_TYPE="00000000" and PD_MSG_TYPE="00000001" to the BS, which may serve as indication signal(s) specifying that the sender supports IS-801-1 and IS-801-A, respectively. At 1504, the BS may set a BS_LV_REV="00000000" despite that the BS supports IS-801-B. Thus, in response at 1506, the BS may transmit a PD_MSG_TYPE="00000000" with BS_LV_REV="00000000" to the MS, which may serve as capability signal specifying that the sender supports IS-801-1 and which may initiate a position determination communication session, at 1508, using such positioning protocol version.

Figure 16:
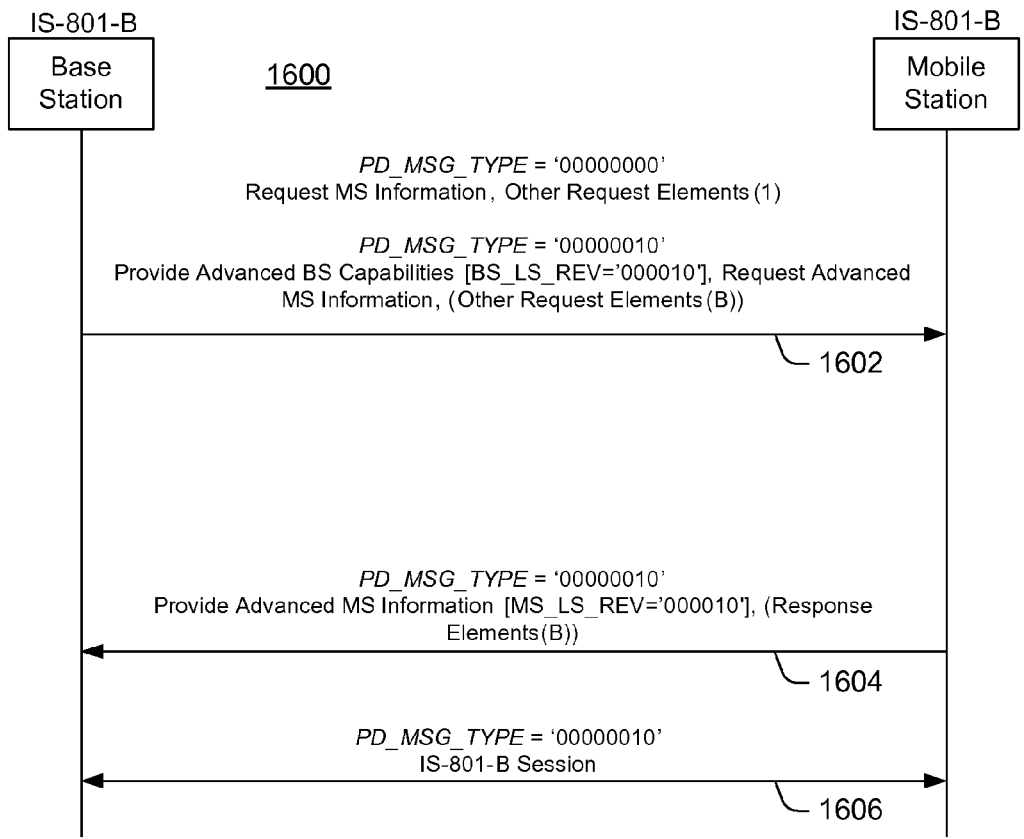
FIG. 16 is a flow diagram illustrating an exemplary message exchange between two devices enabled to initiate and/or otherwise support a position determination process using one or more positioning protocol versions, in accordance with certain implementations.

FIG. 16 shows an example version negotiation process 1600, wherein an originating BS supports IS-801-1 and IS-801-B, and a terminating MS supports IS-801-1 and IS-801-B. As shown at 1602, the BS may transmit PD_MSG_TYPE="00000000" and PD_MSG_TYPE="00000010" to the MS, which may serve as indication signal(s) specifying that the sender supports IS-801-1 and IS-801-B, respectively. In response at 1604, the MS may transmit a PD_MSG_TYPE="00000010" to the BS, which may serve as capability signal specifying that the sender supports IS-801-B and which may initiate a position determination communication session, at 1606, using such positioning protocol version.

Figure 17:
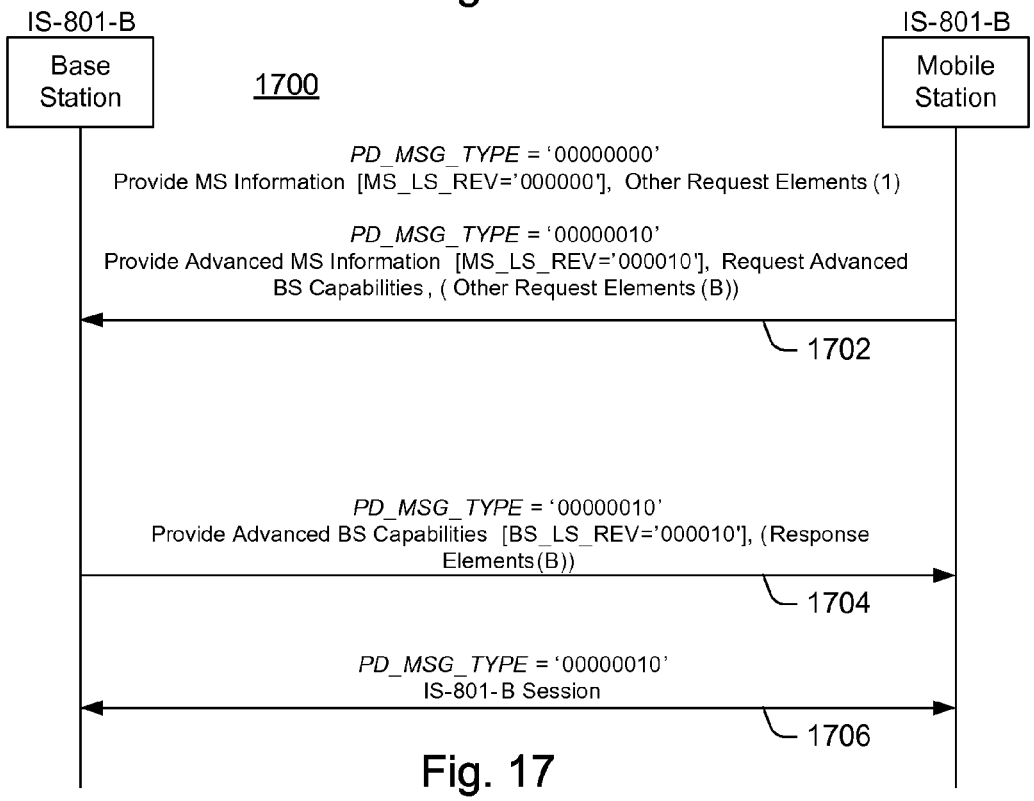
FIG. 17 is a flow diagram illustrating an exemplary message exchange between two devices enabled to initiate and/or otherwise support a position determination process using one or more positioning protocol versions, in accordance with certain implementations.

FIG. 17 shows an example version negotiation process 1700, wherein an originating MS supports IS-801-1 and IS-801-B, and a terminating BS supports IS-801-1 and IS-801-B. As shown at 1702, the MS may transmit PD_MSG_TYPE="00000000" and PD_MSG_TYPE="00000010" to the BS, which may serve as indication signal(s) specifying that the sender supports IS-801-1 and IS-801-B, respectively. In response at 1704, the BS may transmit a PD_MSG_TYPE="00000010" to the MS, which may serve as capability signal specifying that the sender supports IS-801-B and which may initiate a position determination communication session, at 1706, using such positioning protocol version.

Figure 18:
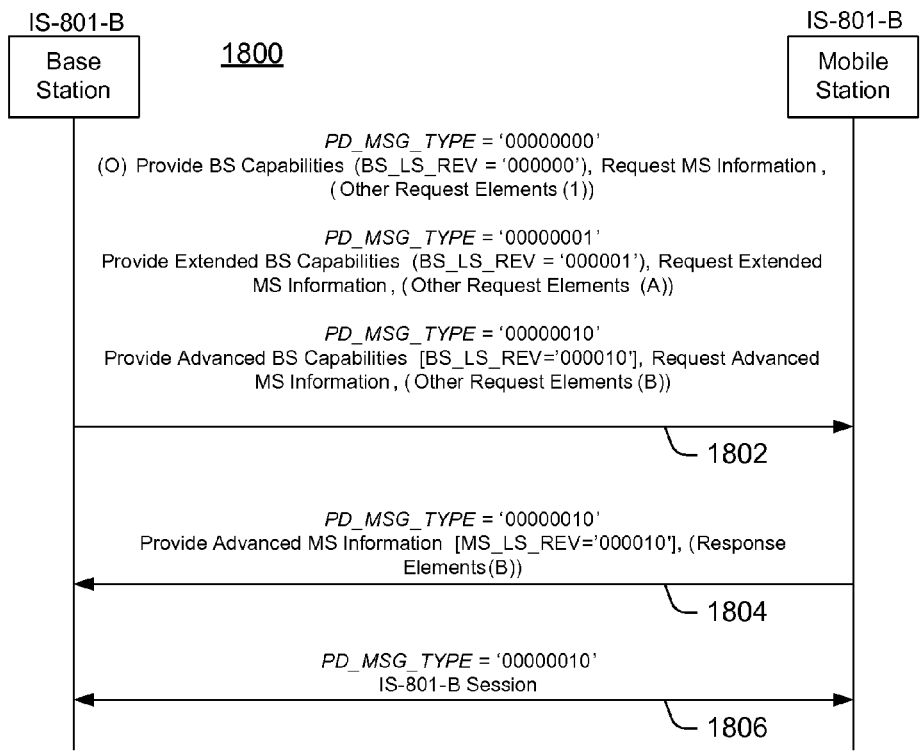
FIG. 18 is a flow diagram illustrating an exemplary message exchange between two devices enabled to initiate and/or otherwise support a position determination process using one or more positioning protocol versions, in accordance with certain implementations.

FIG. 18 shows an example version negotiation process 1800, wherein an originating BS supports IS-801-1, IS-801-A and IS-801-B, and a terminating MS supports IS-801-1, IS-801-A and IS-801-B. As shown at 1802, the BS may transmit PD_MSG_TYPE="00000000", PD_MSG_TYPE="00000001", and PD_MSG_TYPE="00000010" to the MS, which may serve as indication signal(s) specifying that the sender supports IS-801-1, IS-801-A, and IS-801-B, respectively. In response at 1804, the MS may transmit a PD_MSG_TYPE="00000010" to the BS, which may serve as capability signal specifying that the sender supports IS-801-B and which may initiate a position determination communication session, at 1806, using such positioning protocol version.

Figure 19:
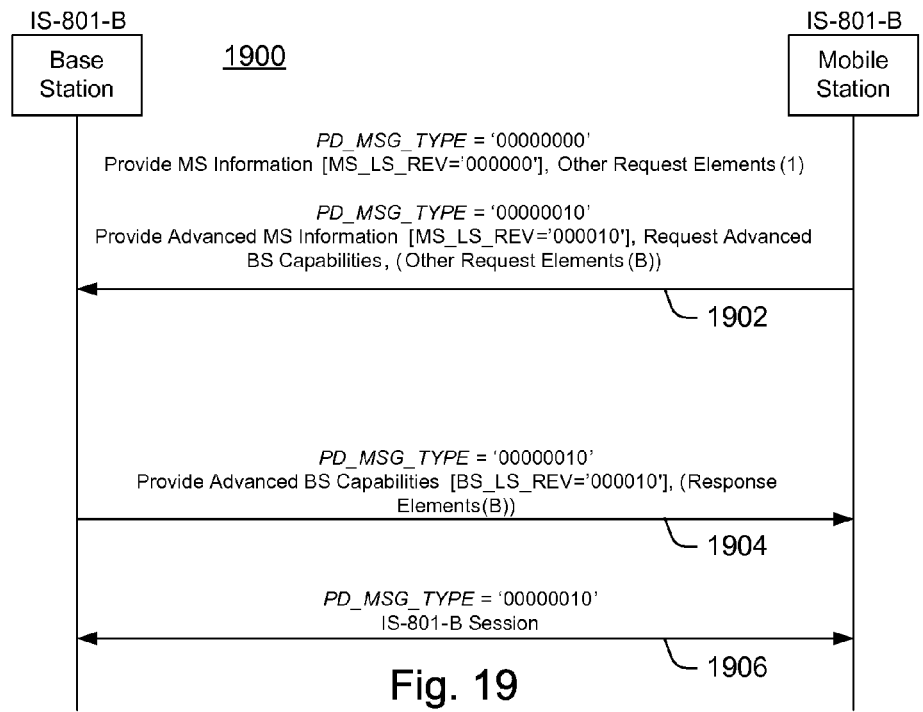
FIG. 19 is a flow diagram illustrating an exemplary message exchange between two devices enabled to initiate and/or otherwise support a position determination process using one or more positioning protocol versions, in accordance with certain implementations.

FIG. 19 shows an example version negotiation process 1900, wherein an originating MS supports IS-801-1, IS-801-A and IS-801-B, and a terminating BS supports IS-801-1, IS-801-A and IS-801-B. As shown at 1902, the MS may transmit PD_MSG_TYPE="00000000" and PD_MSG_TYPE="00000010" to the MS, which may serve as indication signal(s) specifying that the sender supports IS-801-1 and IS-801-B, respectively. In response at 1904, the BS may transmit a PD_MSG_TYPE="00000010" to the MS, which may serve as capability signal specifying that the sender supports IS-801-B and which may initiate a position determination communication session, at 1906, using such positioning protocol version.

FIG. 20 is an illustrative diagram 2000 illustrating initial portions of some example PDDM messages that may provide an indication signal(s) to initiate and/or otherwise support a position determination process using one or more positioning protocol versions. Here, for example, message 2002 has PD_MSG_TYPE="00000000" and may be compliant with IS-801-1, message 2004 has PD_MSG_TYPE="00000001" and may be compliant with IS-801-A, and message 2006 has PD_MSG_TYPE="00000010" and may be compliant with IS-801-B and/or extendable to be forward compliant with one or more future IS-801 versions and/or the like. Message 2006, for example, may include message length fields/information, e.g., PD_MSG_LEN (MSB) and PD_MSG_LEN (LSB). Message 2006, for example, may include an a payload encoded, at least in part, using an extensible syntax language, e.g., an Abstract Syntax Notation One (ASN.1), an Extensible Markup Language (XML), and/or the like.

FIG. 21 is an illustrative diagram 2100 illustrating example transport message having a plurality of PDDM messages, e.g., as in FIG. 20, which as shown in this example may be concatenated together and transmitted in a single transport message. The receiving device may decode the IS-801-1, detect the presence of non-expected bits at the end to the first PDDM (e.g., the PD_MSG_TYPE="00000000" PDDM), and decode any additional PDDMs (here, e.g., the PD_MSG_TYPE="00000001" PDDM and PD_MSG_TYPE="00000010" PDDM). Thus, for example, the PD_MSG_LEN fields/information may identify the starting and ending points for the PDDMs. In certain implementations, for example, a device may parse through or otherwise process all or portions of such indication signal(s), perhaps skipping over some of the data, to identify certain pertinent data.

Figure 22:
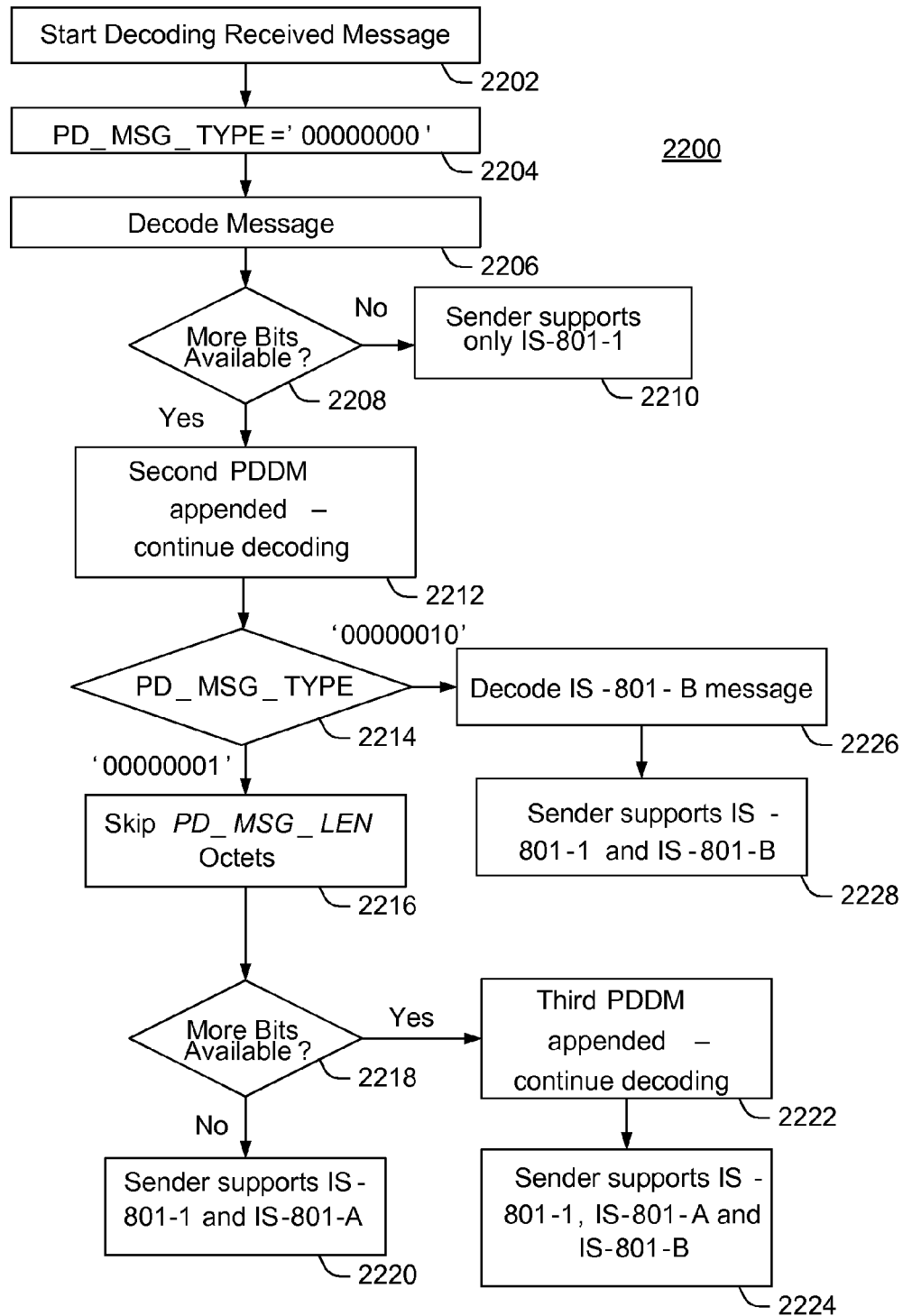
FIG. 22 is a flow-diagram illustrating an exemplary method that may be implemented in one or more devices to process a transport message, for example, as in FIG. 21, to initiate and/or otherwise support a position determination process in accordance with an implementation.

By way of further example, FIG. 22 is a flow-diagram illustrating an exemplary method 2200 that may be implemented in one or more apparatuses to process a transport message, for example, as in FIG. 21. At block 2202, a transport message may be received or otherwise accessed. At block 2204, a PD_MSG_TYPE="00000000" may be identified and associated PDDM decoded at block 2206. At block 2208, it may be determined whether more bits (e.g., beyond the end of the PD_MSG_TYPE="00000000" PDDM) may be available. If the decision at block 2208 is NO, then at block 2210 it may be established that the sender is only enabled to support IS-801-1. If the decision at block 2208 is YES, then at block 2212 decoding of the additional bits may continue to detect a PD_MSG_TYPE associated with another PDDM. Thus, for example, at block 2214 it may be determined whether the PD_MSG_TYPE="00000001" then at block 2216 (if IS-801-A is supported by the terminating device) the PD_MSG_TYPE="00000001" may be skipped over and at block 2218 it may be determined whether more bits (e.g., beyond the end of the PD_MSG_TYPE="00000001" PDDM) are available.

If the decision at block 2218 is NO, then at block 2220 it may be established that the sender is enabled to support IS-801-1 and IS-801-A. If the decision at block 2218 is YES, then at block 2222 decoding of the additional bits may continue to detect a PD_MSG_TYPE associated with another PDDM. Here, for example a third PDDM may include a PD_MSG_TYPE="00000010" PDDM, such that at block 2224 it may be established that the sender is enabled to support IS-801-1, IS-801-A, and IS-801-B. At block 2222, the third PDDM may be decoded.

With reference back to block 2214, if it is determined that the PD_MSG_TYPE="00000010" then at block 2226 the IS-801-B PDDM may be decoded, and at block 2228, it may be established that the sender is enabled to support IS-801-1 and IS-801-B.

Figure 23:
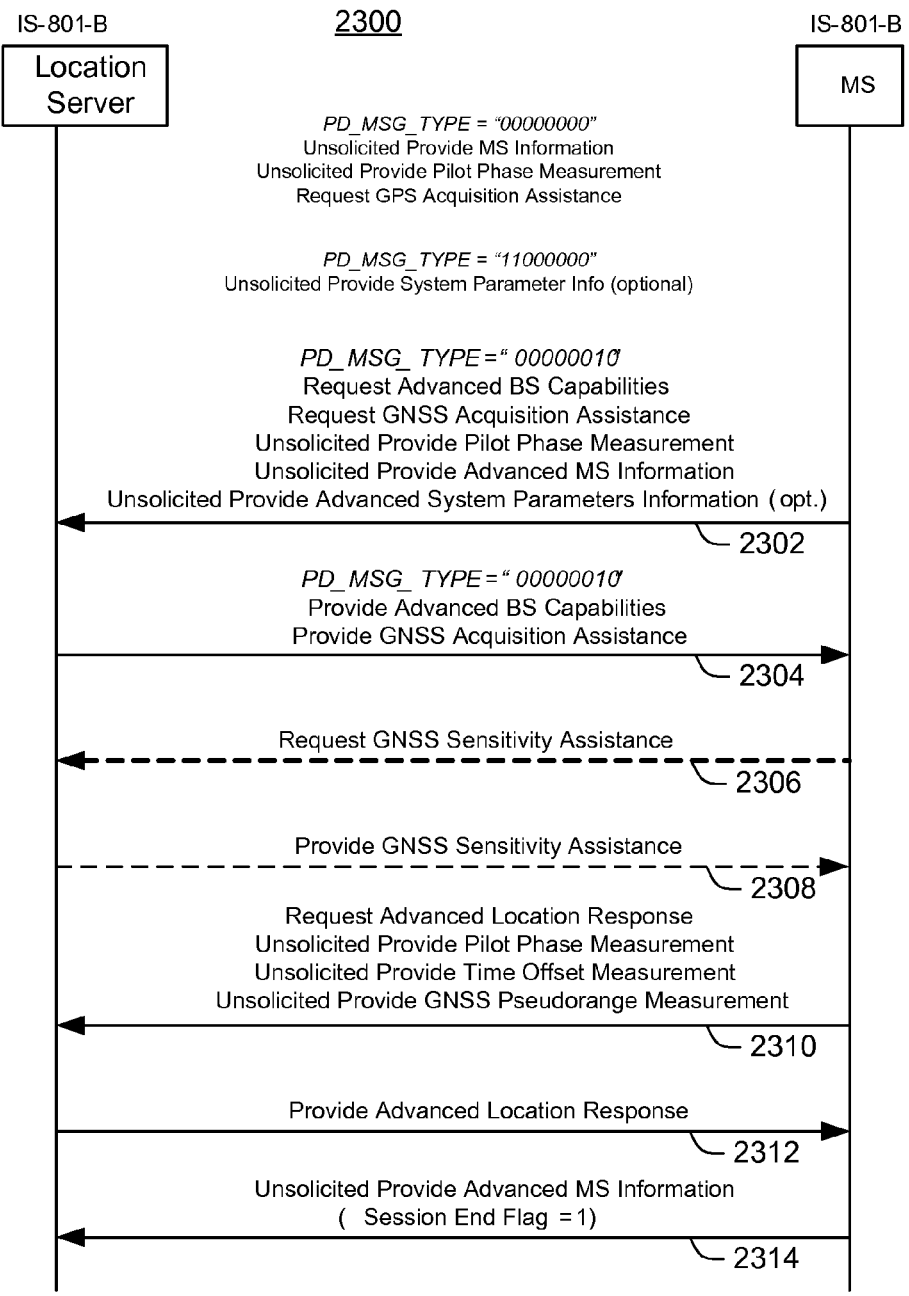
FIG. 23 is a flow diagram illustrating an exemplary message exchange between two devices enabled to initiate and/or otherwise support a position determination process using one or more positioning protocol versions, in accordance with certain implementations.

Reference is now made to FIG. 23, which is a flow diagram illustrating some example message exchanges between two devices (e.g., a location server and a MS) that may occur as part of a position determination process 2300. Here, for example, position determination process 2300 may be enabled while initiating and/or following initiation of a position determination communication session established using a third positioning protocol version. By way of example, but not limitation, a third positioning protocol version may be compliant with IS-801-B.

In position determination process 2300, for example, a MS may transmit one or more message(s) 2302 (e.g. PDDMs and/or transport messages) to a location server to request and/or provide certain positioning related information/elements. By way of example but not limitation, as part of IS-801-B message(s) 2302 may include a Request Advanced BS Capabilities, a Request GNSS Acquisition Assistance, an unsolicited Provide Pilot Phase Measurement, an unsolicited Provide Advanced MS Information, and an unsolicited Provide Advanced System Parameters Information. Thus, for example, at this point in position determination process 2300 the MS may measure a pilot phases from all visible BS's and send such measurements to the location server through the Provide Pilot Phase Measurement message. Additionally, the MS may send the Provide Advanced MS Information message (e.g., indicating the MS's desired positioning capabilities), and optionally, the Provide Advanced System Parameters Information message. The MS may send the Request Advanced BS Capabilities, and a Request GNSS Acquisition Assistance.

In position determination process 2300, for example, the location server may transmit one or more message(s) 2304 (e.g. PDDMs and/or transport messages) to the MS to provide certain positioning related information/elements. By way of example but not limitation, as part of IS-801-B message(s) 2304 may include a Provide Advanced BS Capabilities message and a Provide GNSS Acquisition Assistance message. Thus, for example, at this point in position determination process 2300, using the provided pilot phase measurements, the location server may estimates a preliminary position of the MS. This position may be referred to as a prefix. Based on this prefix, the location server may determine one or more search windows for the visible SVs and may send such information to the MS via the Provide GNSS Acquisition Assistance message.

Also as shown with position determination process 2300, for example, a MS may transmit one or more message(s) 2306 (e.g. PDDMs and/or transport messages) to the location server as part of IS-801-B message(s) 2306, such as, a Request GNSS Sensitivity Assistance message. For example, a MS may determine that GNSS Sensitivity Assistance (SA) may be useful in detecting weak signals from a GNSS SV, and as such request such SA information from location server. As shown, the location server may respond by sending one or more message(s) 2308, such as, a Provide GNSS Sensitivity Assistance message to the MS. Thus, for example, the MS may then attempt to use the GNSS SA information received from the location server to continue measuring pseudoranges and possibly re-measuring pilot phases.

As shown with position determination process 2300, for example, a MS may transmit one or more message(s) 2310 (e.g. PDDMs and/or transport messages) to the location server as part of IS-801-B message(s) 2310, such as, a Request Advanced Location Response message, an unsolicited Provide Pilot Phase Measurement message, an unsolicited Provide Time Offset Measurement message, and an unsolicited Provide GNSS Pseudorange Measurement message. For example, pseudorange measurement data may be sent to the location server through the Provide GNSS Pseudorange Measurement message. The MS may also provide pilot phase measurement data from the visible base stations again via the Provide Pilot Phase Measurement message. A Provide Time Offset Measurement message may be included, for example, if a carrier is 1X. Along with such measurements, a Request Location Response message may be sent to the location server.

As illustrated in this example, the location server may transmit one or more message(s) 2312 to the MS to provide certain positioning related information/elements. By way of example but not limitation, as part of IS-801-B message(s) 2304 may include a Provide Advanced Location Capabilities message. Thus, for example, at this point in position determination process 2300, using the received measurements from messages 2310, a final position of the MS may be determined by the location server and final position information may be sent to the MS to complete the call flow. For example, as illustrated by the response of the MS in sending message(s) 2314, the MS may send an unsolicited Provide Advanced MS Information message that includes a Session End Flag set to terminate the session (e.g., here, Session End Flag=1).

By way of further example, as part of IS-801-B request elements sent by a MS may include one or more of the following: a Request Location Response, a Request BS Capabilities, a Request Base Station Almanac, a Request GPS Acquisition Assistance, Request GPS Sensitivity Assistance, a Request GPS Location Assistance, Request GPS Almanac, a Request GPS Ephemeris, a Request GPS Navigation Message Bits, a Request GPS Almanac Correction, a Request GPS Satellite Health Information, a Request Extended Location Response, a Request Extended BS Capabilities, a Request Enhanced Base Station Almanac, a Request General Acquisition Assistance, a Request Extended GPS Sensitivity Assistance, a Request GPS Almanac v1, a Request Extended GPS Ephemeris, a Request Extended GPS Navigation Message Bits, a Request Extended GPS Almanac Correction, a Request Extended GPS Satellite Health Information, a Request GPS Coarse Location Assistance, a Request GPS Coarse Acquisition Assistance, a Request DGPS Assistance, a Request GPS Real-Time Integrity Information, a Request Advanced Location Response, a Request Advanced BS Capabilities, a Request Advanced UMB Base Station Almanac, a Request Advanced HRPD Base Station Almanac, a Request Advanced 1X Base Station Almanac, a Request GNSS Acquisition Assistance, a Request GNSS Sensitivity Assistance, a Request Modernized GPS Ephemeris and Clock Correction, a Request QZSS Ephemeris and Clock Correction, a Request GLONASS Ephemeris and Clock Correction, a Request Galileo Ephemeris and Clock Correction, a Request GEO Navigation Message Parameters, a Request Modernized GPS Almanac, a Request QZSS Almanac, a Request GLONASS Almanac, a Request Galileo Almanac, a Request GEO Almanacs Message Parameters, a Request GPS Ionospheric Model, a Request GALILEO Ionospheric Model, a Request QZSS Ionospheric Model, a Request GNSS-GNSS Time Offset, a Request GPS UTC Model, a Request Advanced GNSS Satellite Health Information, and/or a Request DGNSS Assistance.

By way of further example, as part of IS-801-B response elements sent by a MS may include one or more of the following: a Reject, a Provide Location Response, Provide MS Information, a Provide Autonomous Measurement Weighting Factors, a Provide Pseudorange Measurement, a Provide Pilot Phase Measurement, a Provide Time Offset Measurement, a Provide Cancellation Acknowledgement, am Extended Reject, a Provide Extended Location Response, a Provide Extended MS Information; a Provide Autonomous Measurement Weighting Factors v1, a Provide General Location Measurement, a Provide Extended Cancellation Acknowledgement, a Provide GPS Coarse Location Response, a Provide Messaging Delay Measurement, a Provide Bearing Measurement, a Provide Serving System Information, an Advanced Reject, a Provide Advanced Location Response, a Provide Advanced MS Information, a Provide UMB Pilot Time Offset Measurement, a Provide HRPD Pilot Phase Measurement, a Provide GNSS Pseudorange Measurement, a Provide Advanced Cancellation Acknowledgement, and/or a Provide Advanced System Parameters Information.

By way of further example, as part of IS-801-B request elements received by a MS may include one or more of the following: a Request Location Response, a Request MS Information, a Request Autonomous Measurement Weighting Factors, a Request Pseudorange Measurement, a Request Pilot Phase Measurement, a Request Time Offset Measurement, a Request Cancellation, a Request Extended Location Response, a Request Extended MS Information, a Request Autonomous Measurement Weighting Factors v1, a Request General Location Measurement, a Request Extended Cancellation, a Request GPS Coarse Location Response, a Request Messaging Delay Measurement, a Request Bearing Measurement, a Request Serving System Information, a Request Advanced Location Response, a Request Advanced MS Information, a Request UMB Pilot Time Offset Measurement, a Request HRPD Pilot Phase Measurement, a Request GNSS Pseudorange Measurement, a Request Advanced Cancellation, and/or a Request Advanced System Parameters Information.

By way of further example, as part of IS-801-B response elements received by a MS may include one or more of the following: a Reject, a Provide Location Response, a Provide BS Capabilities, a Provide Base Station Almanac, a Provide GPS Acquisition Assistance, a Provide GPS Sensitivity Assistance, a Provide GPS Location Assistance—Spherical Coordinates, a Provide GPS Location Assistance—Cartesian Coordinates, a Provide GPS Almanac, a Provide GPS Ephemeris, a Provide GPS Navigation Message Bits, a Provide GPS Almanac Correction, a Provide GPS Satellite Health Information, an Extended Reject, a Provide Extended Location Response, a Provide Extended BS Capabilities, a Provide Enhanced Base Station Almanac, a Provide General Acquisition Assistance, a Provide Extended GPS Sensitivity Assistance, a Provide GPS Almanac v1, a Provide Extended GPS Ephemeris, a Provide Extended GPS Navigation Message Bits, a Provide Extended GPS Almanac Correction, a Provide Extended GPS Satellite Health Information, a Provide GPS Coarse Location Assistance, a Provide GPS Coarse Acquisition Assistance, a Provide DGPS Assistance, a Provide GPS Real-Time Integrity Information, an Advanced Reject, a Provide Advanced Location Response, a Provide Advanced BS Capabilities, a Provide Advanced UMB Base Station Almanac, a Provide Advanced HRPD Base Station Almanac, a Provide Advanced 1X Base Station Almanac, a Provide GNSS Acquisition Assistance, a Provide GNSS Sensitivity Assistance, a Provide Modernized GPS Ephemeris and Clock Correction, a Provide QZSS Ephemeris and Clock Correction, a Provide GLONASS Ephemeris and Clock Correction, a Provide Galileo Ephemeris and Clock Correction, a Provide GEO Navigation Message Parameters, a Provide Modernized GPS Almanac, a Provide QZSS Almanac, a Provide GLONASS Almanac, a Provide Galileo Almanac, a Provide GEO Almanacs Message Parameters, a Provide GPS Ionospheric Model, a Provide GALILEO Ionospheric Model, a Provide QZSS Ionospheric Model, a Provide GNSS-GNSS Time Offset, a Provide GPS UTC Model, a Provide Advanced GNSS Satellite Health Information, and/or a Provide DGNSS Assistance.

By way of further example, as part of IS-801-B, a MS may be enabled to perform the following example positioning protocol version negotiation procedures:

(1) If the MS initiates a position determination communication session then the MS may include a PDDM for each positioning protocol version it supports in the first Data Burst Message or IP Packet sent to a BS according to the following:

(a) In the first PDDM the MS may set the PD_MSG_TYPE field to '00000000' (e.g., a value indicative of IS-801-1) and may include a "Request BS Capabilities" request element and a "Provide MS Information" response element;

(b) If MS_LS_REV of type '000001' is supported by the MS then in the second PDDM the MS may set the PD_MSG_TYPE field to '00000001' (e.g., a value indicative of IS-801-A) and may include a "Request Extended BS Capabilities" request element and a "Provide Extended MS Information" response element;

(c) In the last PDDM the MS may set the PD_MSG_TYPE field to '00000010' (e.g., a value indicative of IS-801-B) and may include a "Request Advanced BS Capabilities" request element and a "Provide Advanced MS Information" response element;

(2) If the BS initiates a position determination communication session then the MS may respond using the highest mutually supported positioning protocol version.

(3) Once a positioning protocol version has been negotiated that protocol version may be used for the duration of the position determination communication session. Thus, any unexpected messages may simply be ignored.

By way of further example, as part of IS-801-B request elements sent by a BS and/or the like may include one or more of the following: a Request Location Response, a Request MS Information, a Request Autonomous Measurement Weighting Factors, a Request Pseudorange Measurement, a Request Pilot Phase Measurement, a Request Time Offset Measurement, a Request Cancellation, a Request Extended Location Response, a Request Extended MS Information, a Request Autonomous Measurement Weighting Factors v1, a Request General Location Measurement, a Request Extended Cancellation, a Request GPS Coarse Location Response, a Request Messaging Delay Measurement, a Request Bearing Measurement, a Request Serving System Information, a Request Advanced Location Response, a Request Advanced MS Information, a Request UMB Pilot Time Offset Measurement, a Request HRPD Pilot Phase Measurement, a Request GNSS Pseudorange Measurement, a Request Advanced Cancellation, and/or a Request Advanced System Parameters Information.

By way of further example, as part of IS-801-B response elements sent by a BS and/or the like may include one or more of the following: a Reject, a Provide Location Response, a Provide BS Capabilities, a Provide Base Station Almanac, a Provide GPS Acquisition Assistance, a Provide GPS Sensitivity Assistance, a Provide GPS Location Assistance—Spherical Coordinates, a Provide GPS Location Assistance—Cartesian Coordinates, a Provide GPS Almanac, a Provide GPS Ephemeris, a Provide GPS Navigation Message Bits, a Provide GPS Almanac Correction, a Provide GPS Satellite Health Information, an Extended Reject, a Provide Extended Location Response, a Provide Extended BS Capabilities, a Provide Enhanced Base Station Almanac, a Provide General Acquisition Assistance, a Provide Extended GPS Sensitivity Assistance, a Provide GPS Almanac v1, a Provide Extended GPS Ephemeris, a Provide Extended GPS Navigation Message Bits, a Provide Extended GPS Almanac Correction, a Provide Extended GPS Satellite Health Information, a Provide GPS Coarse Location Assistance, a Provide GPS Coarse Acquisition Assistance, a Provide DGPS Assistance, a Provide GPS Real-Time Integrity Information, an Advanced Reject, a Provide Advanced Location Response, a Provide Advanced BS Capabilities, a Provide Advanced UMB Base Station Almanac, a Provide Advanced HRPD Base Station Almanac, a Provide Advanced 1X Base Station Almanac, a Provide GNSS Acquisition Assistance, a Provide GNSS Sensitivity Assistance, a Provide Modernized GPS Ephemeris and Clock Correction, a Provide QZSS Ephemeris and Clock Correction, a Provide GLONASS Ephemeris and Clock Correction, a Provide Galileo Ephemeris and Clock Correction, a Provide GEO Navigation Message Parameters, a Provide Modernized GPS Almanac, a Provide QZSS Almanac, a Provide GLONASS Almanac, a Provide Galileo Almanac, a Provide GEO Almanacs Message Parameters, a Provide GPS Ionospheric Model, a Provide GALILEO Ionospheric Model, a Provide QZSS Ionospheric Model, a Provide GNSS-GNSS Time Offset, a Provide GPS UTC Model, a Provide Advanced GNSS Satellite Health Information, and/or a Provide DGNSS Assistance.

By way of further example, as part of IS-801-B request elements received by a BS and/or the like may include one or more of the following: a Request Location Response, a Request BS Capabilities, a Request Base Station Almanac, a Request GPS Acquisition Assistance, a Request GPS Sensitivity Assistance, a Request GPS Location Assistance, a Request GPS Almanac, a Request GPS Ephemeris, a Request GPS Navigation Message Bits, a Request GPS Almanac Correction, a Request GPS Satellite Health Information, a Request Extended Location Response, a Request Extended BS Capabilities, a Request Enhanced Base Station, a Request General Acquisition Assistance, a Request Extended GPS Sensitivity, a Request GPS Almanac v1, a Request Extended GPS Ephemeris, a Request Extended GPS Navigation Message Bits, a Request Extended GPS Almanac Correction, a Request Extended GPS Satellite Health Information, a Request GPS Coarse Location Assistance, a Request GPS Coarse Acquisition Assistance, a Request DGPS Assistance, a Request GPS Real-Time Integrity Information, a Request Advanced Location Response, a Request Advanced BS Capabilities, a Request Advanced UMB Base Station Almanac, a Request Advanced HRPD Base Station Almanac, a Request Advanced 1X Base Station Almanac, a Request GNSS Acquisition Assistance, a Request GNSS Sensitivity Assistance, a Request Modernized GPS Ephemeris and Clock Correction, a Request QZSS Ephemeris and Clock Correction, a Request GLONASS Ephemeris and Clock Correction, a Request Galileo Ephemeris and Clock Correction, a Request GEO Navigation Message Parameters, a Request Modernized GPS Almanac, a Request QZSS Almanac, a Request GLONASS Almanac, a Request Galileo Almanac, a Request GEO Almanacs Message Parameters, a Request GPS Ionospheric Mode, a Request GALILEO Ionospheric Model, a Request QZSS Ionospheric Model, a Request GNSS-GNSS Time Offset, a Request GPS UTC Model, a Request Advanced GNSS Satellite Health Information, and/or a Request DGNSS Assistance.

By way of further example, as part of IS-801-B response elements received by a BS and/or the like may include one or more of the following: a Reject, a Provide Location Response, a Provide MS Information, a Provide Autonomous Measurement Weighting Factors, a Provide Pseudorange Measurement, a Provide Pilot Phase Measurement, a Provide Time Offset Measurement, a Provide Cancellation Acknowledgement, a Extended Reject, a Provide Extended Location Response, a Provide Extended MS Information, a Provide Autonomous Measurement Weighting Factors v1, a Provide General Location Measurement, a Provide Extended Cancellation Acknowledgement, a Provide GPS Coarse Location Response, a Provide Messaging Delay Measurement, a Provide Bearing Measurement, a Provide Serving System Information, an Advanced Reject, a Provide Advanced Location Response, a Provide Advanced MS Information, a Provide UMB Pilot Time Offset Measurement, a Provide HRPD Pilot Phase Measurement, a Provide GNSS Pseudorange Measurement, a Provide Advanced Cancellation Acknowledgement, and/or a Provide Advanced System Parameters Information.

By way of further example, as part of IS-801-B, a BS and/or other like device may be enabled to perform the following example positioning protocol version negotiation procedures:

(1) If the BS initiates a position determination communication session, then the BS may include a PDDM for each positioning protocol version it supports in the first Data Burst Message or IP Packet sent to a MS according to the following:

(a) In the first PDDM the BS may set the PD_MSG_TYPE field to '00000000' (e.g., a value indicative of IS-801-1) and may include a "Request MS Information" request element and a "Provide BS Capabilities" response element;

(b) If BS_LS_REV of type '00000001' (e.g., a value indicative of IS-801-A) is supported by the BS then in the second PDDM the BS may set the PD_MSG_TYPE field to '00000001' and may include a "Request Extended MS Information" request element and a "Provide Extended BS Capabilities" response element;

(c) In the last PDDM the BS may set the PD_MSG_TYPE field to '00000010' (e.g., a value indicative of IS-801-B) and may include a "Request Advanced MS Information" request element and a "Provide Advanced BS Capabilities" response element.

(2) If the MS initiates a position determination communication session then the BS may respond using the highest mutually supported positioning protocol version.

(3) Once a positioning protocol version has been negotiated that protocol version may be used for the duration of the session. Any unexpected messages may simply be ignored.

Figure 24:
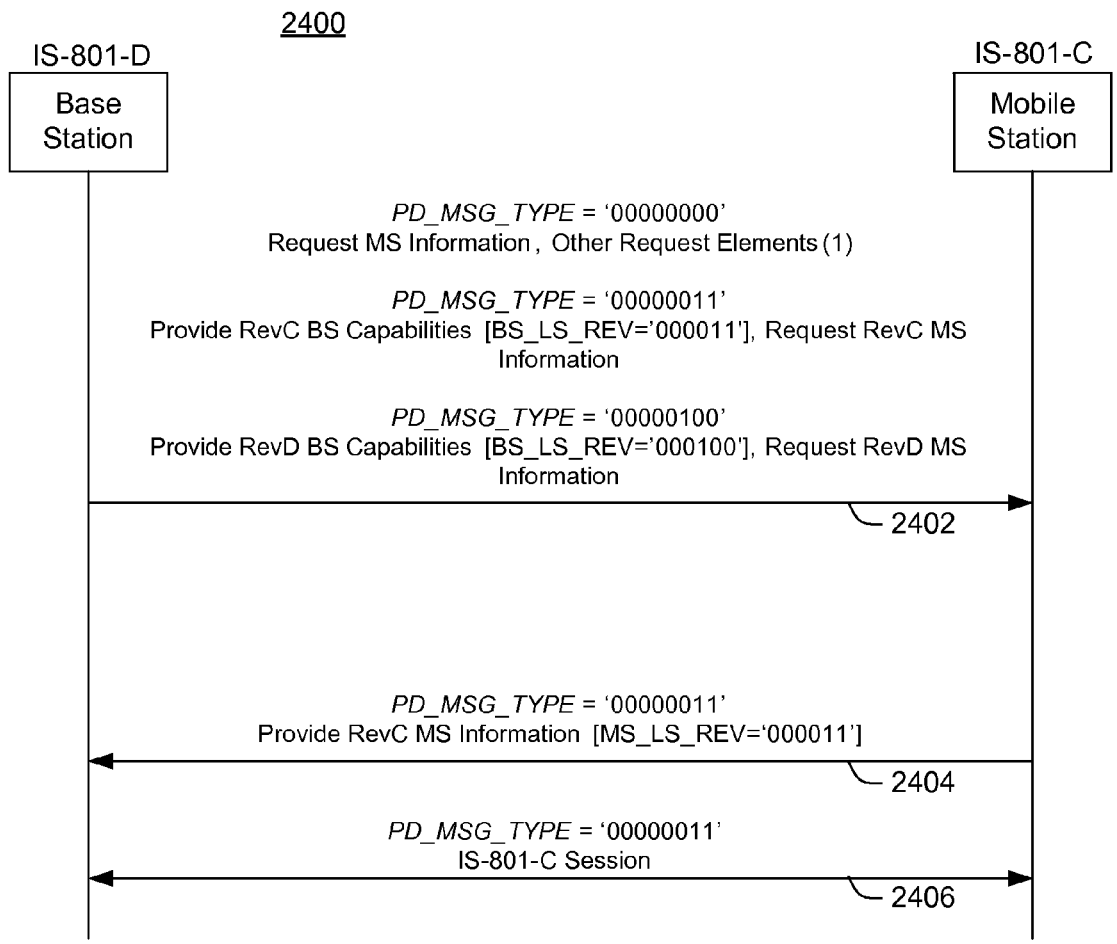
FIG. 24 is a flow diagram illustrating an exemplary message exchange between two devices enabled to initiate and/or otherwise support a position determination process using one or more positioning protocol versions, in accordance with certain implementations.

Reference is now made to FIG. 24 which shows another example version negotiation process 2400. Here, an originating BS may be enabled to support hypothetical future positioning services protocol versions "IS-801-C" and "IS-801-D" and IS-801-1. The MS in this example may be enabled to support "IS-801-C" and IS-801-1. As shown at 2402, the BS may transmit PD_MSG_TYPE="00000000", PD_MSG_TYPE="00000011" (e.g., associated with "IS-801-C") and PD_MSG_TYPE="00000100" (e.g., associated with "IS-801-D") to the MS concatenated within a transport message, which may serve as indication signal(s) specifying that the sender supports IS-801-1, "IS-801-C" and "IS-801-D", respectively. In response at 2404, the MS may transmit a PD_MSG_TYPE="00000011" to the MS, which may serve as capability signal specifying that the sender supports "IS-801-C" and which may initiate a position determination communication session, at 2406, using such positioning protocol version.

Figure 25:
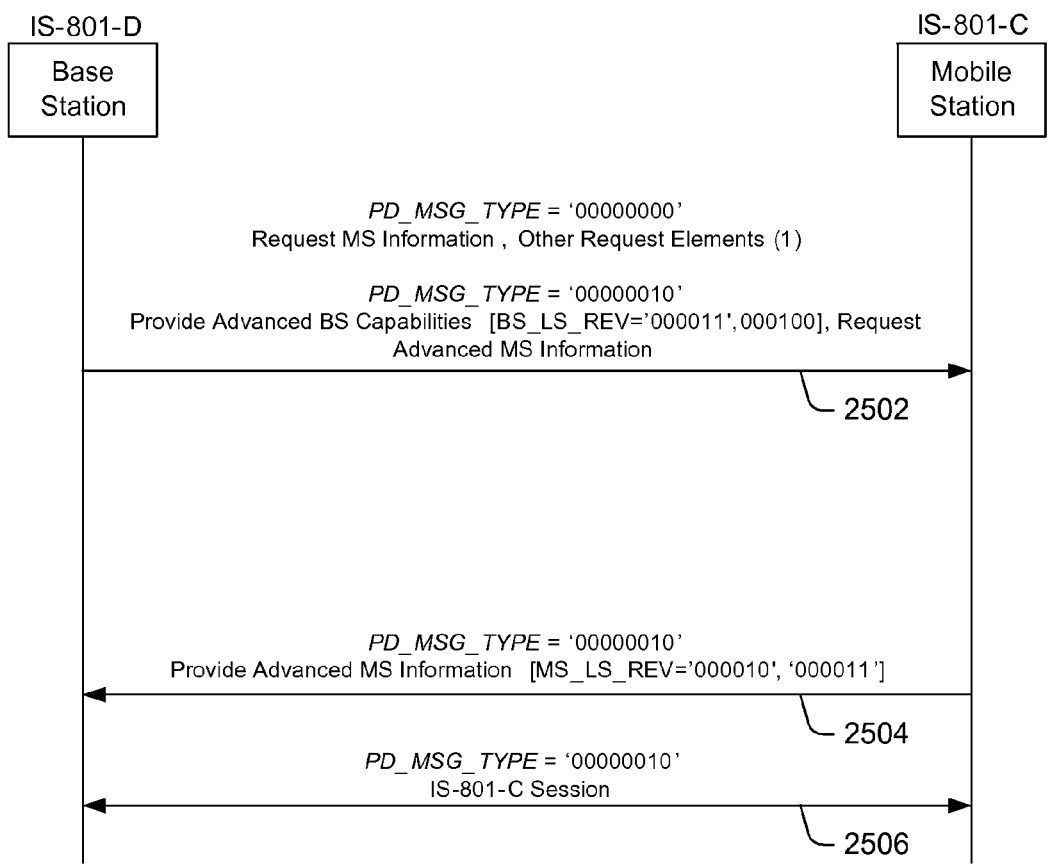
FIG. 25 is a flow diagram illustrating an exemplary message exchange between two devices enabled to initiate and/or otherwise support a position determination process using one or more positioning protocol versions, in accordance with certain implementations.

Reference is now made to FIG. 25 which shows yet another example version negotiation process 2500. Here, an originating BS may be enabled to support hypothetical future positioning services protocol versions "IS-801-C", "IS-801-D" and IS-801-1. The MS in this example may be enabled to support "IS-801-C", IS-801-B and IS-801-1. As shown at 2502, the BS may transmit PD_MSG_TYPE="00000000", and a PD_MSG_TYPE="00000010" to the MS concatenated within a transport message. Here, for example, the PD_MSG_TYPE="00000010" is enabled to serve as indication signal(s) specifying that the sender supports certain additional versions such as "IS-801-C" (e.g., as represented by BS_LS_REV="000011") and "IS-801-D" (e.g., as represented by BS_LS_REV="000100"). In response at 2504, the MS may transmit a PD_MSG_TYPE="00000010" (e.g., with MS_LS_REV="000010", "000011") to the BS, which may serve as capability signal specifying that the sender supports IS-801-B and "IS-801-C" and which may initiate a position determination communication session, at 2506, using the highest mutually supported positioning protocol version, here e.g., "IS-801-C".

While some portions of the detailed description have been presented in terms of algorithms or symbolic representations of operations on binary digital signals stored within a memory of a specific apparatus or special purpose computing device or platform, in the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm as here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent in this description, terms such as "processing", "computing", "calculating", "enabling", "identifying", "detecting", "obtaining", "estimating", "associating", "receiving", "transmitting" "acquiring", "providing", "storing", "accessing", "determining", or the like refer to actions or processes of a specific apparatus, such as a special purpose computer or a similar special purpose electronic computing and/or communication device. In the context of this specification, therefore, a special purpose computer or a similar special purpose electronic computing device may be capable of manipulating or transforming signals, typically represented as physical electronic or magnetic quantities within memories, registers, or other information storage devices, transmission devices, or display devices of the special purpose computer or similar special purpose electronic computing device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it may be intended that claimed subject matter not be limited to the particular examples disclosed, but that such claimed subject matter may also include all aspects falling within the scope of appended claims, and equivalents thereof.

What is claimed is:

1. A method comprising:
 determining, at a first device, a first set of versions of a positioning protocol supported by the first device, wherein the first set includes a first version;
 receiving, at the first device, an indication signal from a second device, wherein the second device supports the first version;
 extracting, at the first device, data from the indication signal regarding whether the second device supports a second version of the positioning protocol and whether the second device supports a third version of the positioning protocol; and
 in response to the extraction, determining a second set of versions of the positioning protocol supported by the second device and initiating a position determination communication session selectively using:
  the first version, in response to determining that an intersection of the first set and the second set does not include the second version and the intersection does not include the third version;
  the second version, in response to determining that the intersection includes the second version and the intersection does not include the third version; or
  the third version, in response to determining that the intersection includes the third version,
 wherein the indication signal includes at least one transport message comprising a set of Position Determination Data Messages (PDDMs), each PDDM of the set of PDDMs having a corresponding version of the second set of versions, and wherein the set of PDDMs includes:

a first PDDM comprising a message type field having a first value associated with the first version;

when the second device supports the second version, a second PDDM comprising the message type field having a second value associated with the second version, a request extended first device capabilities request element, and a provide extended second device information response element; and when the second device supports the third version, a third PDDM comprising the message type field having a third value associated with the third version, a request advanced first device capabilities request element, and a provide advanced second device information response element.

2. The method of claim 1, wherein the first PDDM further comprises at least one of a request first device capabilities request element and a provide second device information response element.

3. The method of claim 1, wherein the at least one transport message further comprises message length information identifying a portion of the transport message associated with at least one of the second PDDM and the third PDDM, and wherein the third PDDM further comprises a payload encoded at least in part using an extensible syntax language.

4. The method of claim 1, wherein the third value is indicative of Telecommunications Industry Association (TIA) protocol IS-801 version B.

5. The method of claim 1, wherein the second device comprises a mobile station (MS) and the first device comprises a base station (BS), and the request advanced first device capabilities request element comprises a Request Advanced BS Capabilities request element and the provide advanced second device information response element comprises a Provide Advanced MS Information response element.

6. The method of claim 1, wherein at least one PDDM of the set of PDDMs comprises a revision level indicator associated with one of the first version, the second version, and the third version.

7. The method of claim 1, wherein the position determination communication session using the third version enables the first and second devices to request and to provide information associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

8. The method of claim 1, wherein the position determination communication session using the third version enables the first and second devices to reject and to cancel position determination related processes associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

9. The method of claim 1, wherein one of the first and second devices comprises a mobile station, and another one of the first and second devices comprises a location server.

10. The method of claim 9, wherein the location server comprises at least one of a Position Determination Entity (PDE), a Serving Mobile Location Center (SMLC), a Gateway Mobile Location Center (GMLC), a Standalone AGPS SMLC (SAS), a SUPL Location Platform (SLP), or any combination thereof.

11. The method of claim 9, wherein the mobile station and the location server are operatively enabled to communicate within a Code Division Multiple Access (CDMA) wireless communication network.

12. The method of claim 9, wherein the mobile station and the location server are operatively enabled to support at least a Third-Generation Partnership Project 2 (3GPP2) compliant position determination process.

13. The method of claim 1, wherein the second and third versions comprise different and subsequently developed revisions of at least the first version.

14. The method of claim 1, wherein the first version is compliant with Telecommunications Industry Association (TIA) protocol IS-801 version 1, the second version is compliant with TIA protocol IS-801 version A, and the third version is compliant with TIA protocol IS-801 version B.

15. An apparatus comprising:

means for determining, at a first device, a first set of versions of a positioning protocol supported by the first device, wherein the first set includes a first version;

means for receiving, at the first device, an indication signal from a second device, wherein the second device supports the first version, wherein the indication signal includes at least one transport message comprising a set of Position Determination Data Messages (PDDMs), each PDDM of the set of PDDMs having a corresponding version of a second set of versions of the positioning protocol supported by the second device, and wherein the set of PDDMs includes:

a first PDDM comprising a message type field having a first value associated with the first version;

when the second device supports a second version of the positioning protocol, a second PDDM comprising the message type field having a second value associated with the second version, wherein the second PDDM further comprises at least one of a request extended first device capabilities request element and a provide extended second device information response element; and when the second device supports a third version of the positioning protocol, a third PDDM comprising the message type field having a third value associated with the third version, wherein the third PDDM further comprises at least one of a request advanced first device capabilities request element and a provide advanced second device information response element;

means for extracting, at the first device, data from the indication signal regarding whether the second device supports the second version and whether the second device supports the third version; and means for determining, responsive to the means for extracting, the second set of versions and initiating a position determination communication session selectively using:

the first version, in response to determining that an intersection of the first set and the second set does not include the second version and the intersection does not include the third version;

the second version, in response to determining that the intersection includes the second version and the intersection does not include the third version; or the third version, in response to determining that the intersection includes the third version.

16. The apparatus of claim 15, wherein the first PDDM further comprises at least one of a request first device capabilities request element and a provide second device information response element.

17. The apparatus of claim 15, wherein the at least one transport message further comprises message length information identifying a portion of the transport message associated with at least one of the second PDDM and the third PDDM, and wherein the third PDDM further comprises a payload encoded at least in part using an extensible syntax language.

18. The apparatus of claim 15, wherein the third value is indicative of Telecommunications Industry Association (TIA) protocol IS-801 version B.

19. The apparatus of claim 15, wherein the second device comprises a mobile station (MS) and the first device comprises a base station (BS), and the request advanced first device capabilities request element comprises a Request Advanced BS Capabilities request element and the provide advanced second device information response element comprises a Provide Advanced MS Information response element.

20. The apparatus of claim 15, wherein at least one PDDM of the set of PDDMs comprises a revision level indicator associated with one of the first version, the second version, and the third version.

21. The apparatus of claim 15, wherein the position determination communication session using the third version enables the first and second devices to request and to provide information associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

22. The apparatus of claim 15, wherein the position determination communication session using the third version enables the first and second devices to reject and to cancel position determination related processes associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

23. The apparatus of claim 15, wherein one of the first and second devices comprises a mobile station, and another one of the first and second devices comprises a location server.

24. The apparatus of claim 23, wherein the location server comprises at least one of a Position Determination Entity (PDE), a Serving Mobile Location Center (SMLC), a Gateway Mobile Location Center (GMLC), a Standalone AGPS SMLC (SAS), a SUPL Location Platform (SLP), or any combination thereof.

25. The apparatus of claim 23, wherein the mobile station and the location server are operatively enabled to communicate within a Code Division Multiple Access (CDMA) wireless communication network.

26. The of claim 23, wherein the mobile station and the location server are operatively enabled to support at least a Third-Generation Partnership Project 2 (3GPP2) compliant position determination process.

27. The apparatus of claim 15, wherein the second and third versions comprise different and subsequently developed revisions of at least the first version.

28. The apparatus of claim 15, wherein the first version is compliant with Telecommunications Industry Association (TIA) protocol IS-801 version 1, the second version is compliant with TIA IS-801 version A, and the third version is compliant with TIA IS-801 version B.

29. An apparatus comprising:
a transmitter;
memory comprising instructions and information operatively associated with a first set of versions of a positioning protocol that a first device is operatively enabled to support, wherein the first set includes a first version;
a receiver operatively enabled to receive, at the first device, an indication signal from a second device, wherein the second device supports the first version; and
at least one processing unit operatively coupled to the transmitter, the receiver, and the memory, and operatively enabled to:
extract, at the first device, data from the indication signal regarding whether the second device supports a second version of the positioning protocol and whether the second device supports a third version of the positioning protocol; and
in response to the extraction, determine a second set of versions of the positioning protocol supported by the second device and initiate, using the transmitter, a position determination communication session selectively using:
the first version, in response to determining that an intersection of the first set and the second set does not include the second version and the intersection does not include the third version;
the second version, in response to determining that the intersection includes the second version and the intersection does not include the third version; or
the third version, in response to determining that the intersection includes the third version,
wherein the indication signal includes at least one transport message comprising a set of Position Determination Data Messages (PDDMs), each PDDM of the set of PDDMs having a corresponding version of the second set of versions, and wherein the set of PDDMs includes:
a first PDDM comprising a message type field having a first value associated with the first version;
when the second device supports the second version, a second PDDM comprising the message type field having a second value associated with the second version, a request extended first device information request element, and a provide extended second device capabilities response element; and
when the second device supports the third version, a third PDDM comprising the message type field having a third value associated with the third version, a request advanced first device information request element, and a provide advanced second device capabilities response element.

30. The apparatus of claim 29, wherein the first PDDM further comprises at least one of a request first device information request element and a provide second device capabilities response element.

31. The apparatus of claim 29, wherein the at least one transport message further comprises message length information identifying a portion of the transport message associated with at least one of the second PDDM and the third PDDM, and wherein the third PDDM further comprises a payload encoded at least in part using an extensible syntax language.

32. The apparatus of claim 29, wherein the third value is indicative of Telecommunications Industry Association (TIA) protocol IS-801 version B.

33. The apparatus of claim 29, wherein the second device comprises a base station (BS) and the first device comprises a mobile station (MS), and the request advanced first device information request element comprises a Request Advanced MS Information request element and the provide advanced second device capabilities response element comprises a Provide Advanced BS Capabilities response element.

34. The apparatus of claim 29, wherein at least one PDDM of the set of PDDMs comprises a revision level indicator associated with one of the first version, the second version, and the third version.

35. The apparatus of claim 29, wherein the position determination communication session using the third version enables the first and second devices to request and to provide information associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

36. The apparatus of claim 29, wherein the position determination communication session using the third version enables the first and second devices to reject and to cancel position determination related processes associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

37. The apparatus of claim 29, wherein one of the first and second devices comprises a mobile station, and the other one of the first and second devices comprises a location server.

38. The apparatus of claim 37, wherein the location server comprises at least one of a Position Determination Entity (PDE), a Serving Mobile Location Center (SMLC), a Gateway Mobile Location Center (GMLC), a Standalone AGPS SMLC (SAS), a SUPL Location Platform (SLP), or any combination thereof.

39. The apparatus of claim 37, wherein the mobile station and the location server are operatively enabled to communicate within a Code Division Multiple Access (CDMA) wireless communication network.

40. The apparatus of claim 37, wherein the mobile station and the location server are operatively enabled to support at least a Third-Generation Partnership Project 2 (3GPP2) compliant position determination process.

41. The apparatus of claim 29, wherein the second and third versions comprise different and subsequently developed revisions of at least the first version.

42. The apparatus of claim 29, wherein the first version is compliant with Telecommunications Industry Association (TIA) protocol IS-801 version 1, the second version is compliant with IS-801 version A, and the third version is compliant with IS-801 version B.

43. An article comprising a non-transitory computer readable medium having computer implementable instructions stored thereon which when implemented by one or more processing units in a special-purpose first device operatively enable the first device to:
- determine, at the first device, a first set of versions of a positioning protocol supported by the first device, wherein the first set includes a first version;
- receive, at the first device, an indication signal from a second device, wherein the second device supports the first version;
- extract, at the first device, data from the indication signal regarding whether the second device supports a second version of the positioning protocol and whether the second device supports a third version of the positioning protocol; and
- in response to the extraction, determine a second set of versions of the positioning protocol supported by the second device and initiate a position determination communication session selectively using:
  - the first version, in response to determining that an intersection of the first set and the second set does not include the second version and the intersection does not include the third version;
  - the second version, in response to determining that the intersection includes the second version and the intersection does not include the third version; or
  - the third version, in response to determining that the intersection includes the third version,
- wherein the indication signal includes at least one transport message comprising a set of Position Determination Data Messages (PDDMs), each PDDM of the set of PDDMs having a corresponding version of the second set of versions, and wherein the set of PDDMs includes:
  - a first PDDM comprising a message type field having a first value associated with the first version;
  - when the second device supports the second version, a second PDDM comprising the message type field having a second value associated with the second version, a request extended first device information request element, and a provide extended second device capabilities response element; and
  - when the second device supports the third version, a third PDDM comprising the message type field having a third value associated with the third version, a request advanced first device information request element, and a provide advanced second device capabilities response element.

44. The article of claim 43, wherein the first PDDM further comprises at least one of a request first device information request element and a provide second device capabilities response element.

45. The article of claim 43, wherein the at least one transport message further comprises message length information identifying a portion of the transport message associated with at least one of the second PDDM and the third PDDM, and wherein the third PDDM further comprises a payload encoded at least in part using an extensible syntax language.

46. The article of claim 43, wherein the third value is indicative of Telecommunications Industry Association (TIA) protocol IS-801 version B.

47. The article of claim 43, wherein the second device comprises a base station (BS) and the first device comprises a mobile station (MS), and the request advanced first device information request element comprises a Request Advanced MS Information request element and the provide advanced second device capabilities response element comprises a Provide Advanced BS Capabilities response element.

48. The article of claim 43, wherein the at least one PDDM of the set of PDDMs comprises a revision level indicator associated with one of the first version, the second version, and the third version.

49. The article of claim 43, wherein the position determination communication session using the third version enables the first and second devices to request and to provide information associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

50. The article of claim 43, wherein the position determination communication session using the third version enables the first and second devices to reject and to cancel position determination related processes associated with at least one of a Global Navigation Satellite Service (GNSS), an Ultra Mobile Broadband (UMB) network, a High Rate Packet Data (HRPD) network, a Code Division Multiple Access (CDMA) 2000 1X network, or any combination thereof.

51. The article of claim 43, wherein one of the first and second devices comprise a mobile station, and another one of the first and second devices comprises a location server.

52. The article of claim 51, wherein the location server comprises at least one of a Position Determination Entity (PDE), a Serving Mobile Location Center (SMLC), a Gateway Mobile Location Center (GMLC), a Standalone AGPS SMLC (SAS), a SUPL Location Platform (SLP), or any combination thereof.

53. The article of claim 51, wherein the mobile station and the location server are operatively enabled to communicate within a Code Division Multiple Access (CDMA) wireless communication network.

54. The article of claim 51, wherein the mobile station and the location server are operatively enabled to support at least a Third-Generation Partnership Project 2 (3GPP2) compliant position determination process.

55. The article of claim 43, wherein the second and third versions comprise different and subsequently developed revisions of at least the first version.

56. The article of claim 43, wherein the first version is compliant with Telecommunications Industry Association (TIA) protocol IS-801 version 1, the second version is compliant with TIA protocol IS-801 version A, and the third version is compliant with TIA protocol IS-801 version B.

57. A method comprising:
   determining, at a first device, a first set of versions of a positioning protocol supported by the first device, wherein the first set includes a first version, and wherein the first device comprises a base station (BS);
   receiving, at the first device, an indication signal from a second device, wherein the second device supports the first version, and wherein the second device comprises a mobile station (MS);
   extracting, at the first device, data from the indication signal regarding whether the second device supports a second version of the positioning protocol and whether the second device supports a third version of the positioning protocol; and
   in response to the extraction, determining a second set of versions of the positioning protocol supported by the second device and initiating a position determination communication session selectively using:
      the first version, in response to determining that an intersection of the first set and the second set does not include the second version and the intersection does not include the third version;
      the second version, in response to determining that the intersection includes the second version and the intersection does not include the third version; or
      the third version, in response to determining that the intersection includes the third version,
   wherein the indication signal includes at least one transport message comprising a set of Position Determination Data Messages (PDDMs), each PDDM of the set of PDDMs having a corresponding version of the second set of versions, and wherein the set of PDDMs includes:
      a first PDDM comprising a message type field having a first value associated with the first version;
      when the second device supports the second version, a second PDDM comprising the message type field having a second value associated with the second version, a request extended base station capabilities request element, and a provide extended mobile station information response element; and
      when the second device supports the third version, a third PDDM comprising the message type field having a third value associated with the third version, a request advanced base station capabilities request element, and a provide advanced mobile station information response element.

58. An apparatus comprising:
   means for determining, at a first device, a first set of versions of a positioning protocol supported by the first device, wherein the first set includes a first version, and wherein the first device comprises a base station (BS);
   means for receiving, at the first device, an indication signal from a second device, wherein the second device comprises a mobile station (MS), wherein the second device supports the first version, wherein the indication signal includes at least one transport message comprising a set of Position Determination Data Messages (PDDMs), each PDDM of the set of PDDMs having a corresponding version of a second set of versions of the positioning protocol supported by the second device, and wherein the set of PDDMs includes:
      a first PDDM comprising a message type field having a first value associated with the first version;
      when the second device supports a second version of the positioning protocol, a second PDDM comprising the message type field having a second value associated with the second version, wherein the second PDDM further comprises at least one of a request extended base station capabilities request element and a provide extended mobile station information response element; and
      when the second device supports a third version of the positioning protocol, a third PDDM comprising the message type field having a third value associated with the third version, wherein the third PDDM further comprises at least one of a request advanced base station capabilities request element and a provide advanced base station information response element;
   means for extracting, at the first device, data from the indication signal regarding whether the second device supports the second version and whether the second device supports the third version; and
   means for determining, responsive to the means for extracting, the second set of versions and initiating a position determination communication session selectively using:
      the first version, in response to determining that an intersection of the first set and the second set does not include the second version and the intersection does not include the third version;
      the second version, in response to determining that the intersection includes the second version and the intersection does not include the third version; or
      the third version, in response to determining that the intersection includes the third version.

59. An apparatus comprising:
   a transmitter;
   memory comprising instructions and information associated with a first set of versions of a positioning protocol that a first device is operatively enabled to support, wherein the first set includes a first version, and wherein the first device comprises a mobile station (MS);
   a receiver operatively enabled to receive, at the first device, an indication signal from a second device, wherein the second device supports the first version, and wherein the second device comprises a base station (BS); and
   at least one processing unit operatively coupled to the transmitter, the receiver, and the memory, and operatively enabled to:
      extract, at the first device, data from the indication signal regarding whether the second device supports a second version of the positioning protocol and whether the second device supports a third version of the positioning protocol; and in response to the extraction, determine a second set of versions of the positioning protocol supported by the second device and initiate, using the transmitter, a position determination communication session selectively using:
- the first version, in response to determining that an intersection of the first set and the second set does not include the second version and the intersection does not include the third version;
- the second version, in response to determining that the intersection includes the second version and the intersection does not include the third version; or
- the third version, in response to determining that the intersection includes the third version, wherein the indication signal includes at least one transport message comprising a set of Position Determination Data Messages (PDDMs), each PDDM of the set of PDDMs having a corresponding version of the second set of versions, and wherein the set of PDDMs includes:
- a first PDDM comprising a message type field having a first value associated with the first version;
- when the second device supports the second version, a second PDDM comprising the message type field having a second value associated with the second version, a request extended mobile station information request element, and a provide extended base station capabilities response element; and
- when the second device supports the third version, a third PDDM comprising the message type field having a third value associated with the third version, a request advanced mobile station information request element, and a provide advanced base station capabilities response element.

60. An article comprising a non-transitory computer readable medium having computer implementable instructions stored thereon which when implemented by one or more processing units in a special-purpose first device operatively enable the first device to:

- determine, at the first device, a first set of versions of a positioning protocol supported by the first device, wherein the first set includes a first version, and wherein the first device is a mobile station (MS);
- receive, at the first device, an indication signal from a second device, wherein the second device supports the first version, and wherein the second device is a base station (BS);
- extract, at the first device, data from the indication signal regarding whether the second device supports a second version of the positioning protocol and whether the second device supports a third version of the positioning protocol; and
- in response to the extraction, determine a second set of versions of the positioning protocol supported by the second device and initiate a position determination communication session selectively using:
  - the first version, in response to determining that an intersection of the first set and the second set does not include the second version and the intersection does not include the third version;
  - the second version, in response to determining that the intersection includes the second version and the intersection does not include the third version; or
  - the third version, in response to determining that the intersection includes the third version, wherein the indication signal includes at least one transport message comprising a set of Position Determination Data Messages (PDDMs), each PDDM of the set of PDDMs having a corresponding version of the second set of versions, and wherein the set of PDDMs includes:
- a first PDDM comprising a message type field having a first value associated with the first version;
- when the second device supports the second version, a second PDDM comprising the message type field having a second value associated with the second version, a request extended mobile station information request element, and a provide extended base station capabilities response element; and
- when the second device supports the third version, a third PDDM comprising the message type field having a third value associated with the third version, a request advanced mobile station information request element, and a provide advanced base station capabilities response element.

* * * * *